United States Patent
Hutten

(10) Patent No.: US 10,489,389 B2
(45) Date of Patent: Nov. 26, 2019

(54) EXPERIENCE ANALYTIC OBJECTS, SYSTEMS AND METHODS

(71) Applicant: TapThere, Inc., Los Angeles, CA (US)

(72) Inventor: Curt Hutten, Laguna Beach, CA (US)

(73) Assignee: Wormhole Labs, Inc., Huntington Beach, CA (US)

( * ) Notice: Subject to any disclaimer, the term of this patent is extended or adjusted under 35 U.S.C. 154(b) by 41 days.

(21) Appl. No.: 14/066,401

(22) Filed: Oct. 29, 2013

(65) Prior Publication Data

US 2014/0067834 A1 Mar. 6, 2014

Related U.S. Application Data

(63) Continuation-in-part of application No. 14/020,556, filed on Sep. 6, 2013, which is a continuation-in-part of application No. 13/912,567, filed on Jun. 7, 2013.

(Continued)

(51) Int. Cl.
*G06F 16/24* (2019.01)
*H04L 12/24* (2006.01)
*G06Q 30/02* (2012.01)

(52) U.S. Cl.
CPC .......... *G06F 16/24* (2019.01); *G06Q 30/02* (2013.01); *H04L 41/5067* (2013.01)

(58) Field of Classification Search
CPC .. G06F 3/0482; G06F 17/30; G06F 17/30386; G06F 17/30454; G06F 17/30548; G06F 17/30867; G06F 17/30395; G06F 17/30761; G06F 17/30648; G06F 17/30828; G06F 17/17; G06F 16/24; H04L 41/5067; G06Q 30/02

(Continued)

(56) References Cited

U.S. PATENT DOCUMENTS 5,729,471 A 3/1998 Jain et al.
6,111,582 A 8/2000 Jenkins
(Continued)

FOREIGN PATENT DOCUMENTS

AU 2011211447 9/2011
CA 2425739 9/1998
(Continued)

OTHER PUBLICATIONS

Blumenthal, R., "Conference Caster Pro: Crowdsource your multi-camera video footage", https://code.google.com/p/conference-caster-pro, screen capture Jul. 25, 2013.

(Continued)

*Primary Examiner* — Roland J Casillas
(74) *Attorney, Agent, or Firm* — Fish IP Law, LLP

(57) ABSTRACT

A remote experience system is presented. The inventive subject matter provides apparatus, systems and methods in which one can use an experience feed analysis engine to gain better understanding of how experience feeds are viewed, processed, interacted, created, broadcasted, or otherwise managed by means of experience objects and generating experience metrics that can help analyze viewing patterns, broadcasting attributes, event management characteristics, among other features that can help improve and analyze remove viewing experience.

3 Claims, 10 Drawing Sheets

Related U.S. Application Data

(60) Provisional application No. 61/676,452, filed on Jul. 27, 2012, provisional application No. 61/676,443, filed on Jul. 27, 2012, provisional application No. 61/676,436, filed on Jul. 27, 2012, provisional application No. 61/676,431, filed on Jul. 27, 2012, provisional application No. 61/676,426, filed on Jul. 27, 2012, provisional application No. 61/675,271, filed on Jul. 24, 2012, provisional application No. 61/675,268, filed on Jul. 24, 2012, provisional application No. 61/675,263, filed on Jul. 24, 2012, provisional application No. 61/675,258, filed on Jul. 24, 2012, provisional application No. 61/656,619, filed on Jun. 7, 2012.

(58) Field of Classification Search
USPC .......................... 715/720; 709/224, 230–231
See application file for complete search history.

(56) References Cited

U.S. PATENT DOCUMENTS

| | | | |
|---|---|---|---|
| 6,122,660 A | 9/2000 | Baransky et al. | |
| 6,694,352 B1 | 2/2004 | Omoigui | |
| 7,305,173 B2 | 12/2007 | Karimoto et al. | |
| 7,406,436 B1 | 7/2008 | Reisman | |
| 7,558,404 B2 | 7/2009 | Ma et al. | |
| 7,657,920 B2 | 2/2010 | Arseneau et al. | |
| 8,036,929 B1 | 10/2011 | Reisman | |
| 8,037,070 B2 | 10/2011 | Maghoul | |
| 8,060,608 B2 | 11/2011 | Wang et al. | |
| 8,081,636 B2 | 12/2011 | der Hartog et al. | |
| 8,239,888 B2 | 8/2012 | Todd | |
| 8,250,616 B2 | 8/2012 | Davis et al. | |
| 8,286,218 B2 | 10/2012 | Pizzurro et al. | |
| 8,452,884 B2 | 5/2013 | Wang | |
| 8,520,979 B2 | 8/2013 | Conwell | |
| 2003/0105744 A1* | 6/2003 | McKeeth | G06F 16/951 |
| 2003/0105794 A1 | 6/2003 | Jasinschi et al. | |
| 2004/0210923 A1* | 10/2004 | Hudgeons | G06Q 30/02 725/24 |
| 2006/0085392 A1 | 4/2006 | Wang et al. | |
| 2007/0130126 A1 | 6/2007 | Lucovsky et al. | |
| 2007/0180027 A1 | 8/2007 | Boylan | |
| 2007/0198485 A1 | 8/2007 | Ramer et al. | |
| 2008/0060029 A1 | 3/2008 | Park et al. | |
| 2008/0192736 A1 | 8/2008 | Jabri et al. | |
| 2009/0063419 A1 | 3/2009 | Nurminen et al. | |
| 2009/0089294 A1* | 4/2009 | Davis | H04N 7/17318 |
| 2009/0100098 A1* | 4/2009 | Feher et al. | 707/104.1 |
| 2009/0153747 A1 | 6/2009 | Grimes | |
| 2009/0164559 A1 | 6/2009 | Johnson et al. | |
| 2010/0303448 A1 | 12/2010 | Sariya et al. | |
| 2011/0047464 A1 | 2/2011 | McCarthy | |
| 2011/0117934 A1 | 5/2011 | Mate et al. | |
| 2011/0173214 A1 | 7/2011 | Karim | |
| 2011/0294569 A1 | 12/2011 | Tone et al. | |
| 2011/0307623 A1 | 12/2011 | George et al. | |
| 2012/0057459 A1 | 3/2012 | den Hartog et al. | |
| 2012/0059826 A1 | 3/2012 | Mate et al. | |
| 2012/0072938 A1 | 3/2012 | Seong et al. | |
| 2012/0096089 A1 | 4/2012 | Barash et al. | |
| 2012/0192242 A1 | 7/2012 | Kellerer et al. | |
| 2012/0221659 A1 | 8/2012 | Brown et al. | |
| 2012/0233000 A1 | 9/2012 | Fisher et al. | |
| 2012/0265573 A1 | 10/2012 | Van Pelt et al. | |
| 2012/0275377 A1 | 11/2012 | Lehane et al. | |
| 2012/0278428 A1 | 11/2012 | Harrison et al. | |
| 2012/0278725 A1* | 11/2012 | Gordon et al. | 715/738 |
| 2012/0284090 A1 | 11/2012 | Marins et al. | |
| 2012/0284145 A1 | 11/2012 | Kalin et al. | |
| 2012/0300046 A1 | 11/2012 | Blayvas | |
| 2012/0311126 A1 | 12/2012 | Jadallah et al. | |
| 2013/0040660 A1 | 2/2013 | Fisher et al. | |
| 2013/0051271 A1 | 2/2013 | Cao et al. | |
| 2013/0079142 A1 | 3/2013 | Kruglick | |
| 2013/0086170 A1 | 4/2013 | Skelton et al. | |
| 2013/0120587 A1 | 5/2013 | Gu et al. | |
| 2013/0124496 A1 | 5/2013 | Edgar et al. | |
| 2013/0159498 A1 | 6/2013 | Funge et al. | |

FOREIGN PATENT DOCUMENTS

| | | |
|---|---|---|
| EP | 2398231 | 12/2011 |
| EP | 2402894 | 1/2012 |
| JP | 2012004768 | 1/2012 |
| KR | 20050052859 | 6/2005 |
| KR | 20100069139 | 6/2010 |
| WO | 2008/017249 | 2/2008 |
| WO | 2011/004381 | 1/2011 |
| WO | 2012/054048 | 4/2012 |
| WO | 2012/122269 | 9/2012 |

OTHER PUBLICATIONS

"CrowdOptic Augmented Reality and Analytics Platform", CrowdOptic, 2013, www.crowdoptic.com.

Eagle, N., "Reality Mining", MIT Media Lab, 2009, http://reality.media.mit.edu/dataset.php, screen capture Jun. 5, 2012.

Green, K., "TR10: Reality Mining", Technology Review, Mar./Apr. 2008, http://www.technologyreview.com/printer_friendly_article.aspx?id=20247, screen capture Jun. 5, 2012.

O'Hear, S., "Calling All iPhoneographers—Foap Wants to Get You Paid", TechCrunch, Jun. 27, 2012, http://techcrunch.com/2012/06/27/calling-all-iphoneographers-foap-wants-to-get-you-paid.

Perez, S., "Google Adds 20 Museums to Indoor Google Maps, Says More on the Way", Tech Crunch, Jul. 10, 2012, http://m.techcrunch.com/2012/07/10/google-adds-20-museums-to-indoor-google-maps-says-more-on-the-way/.

Spingram-Koff, J., "CrownCam: crowdsourced mobile video stream for journalistic applications", Mozilla Drumbeat, May 2011, https://drumbeat.org/en-US/challenges/unlocking-video/submission/61/.

* cited by examiner

500

Experience Database
502

| User Details | Experience Feed Identifier | Experience Feed Attributes | Experience Feed Metrics |
|---|---|---|---|
| Name: Pam Stewart<br>- Category: Viewer<br>- Age: 22<br>- No. of Feeds Viewed: 32<br>- Address:<br>- Twitter Handle: | Experienced Feed_32 | - Cost: USD 25<br>- Event Desc.: Show by Slash<br>- Length: 122 Minutes<br>- Focal View: Lead Singer<br>- Location: Front Row<br>- Broadcaster: HBO | - Length Watched: 22 Minutes<br>- Portion Watched: 10-32 Mins<br>- Number of Comments on Facebook:<br>- Number of times Focal Area Changed: |
| Name: ABC Broadcaster<br>- Category: Broadcaster<br>- Clients:<br>- No. of Events Broadcasted:<br>- Ranking:<br>- Type of Broadcaster: | Experienced Feed_38 | - Event Manager:<br>- Bid:<br>- Manager:<br>- Length :<br>- Capacity: | - Change in Viewership:<br>- Response to Portions of Feed:<br>- Duration of Highest Response: |
| Name: XYZ Events LLC<br>- Category: Event Manager<br>- Clients:<br>- No. of Events Managed:<br>- Ranking:<br>- Type of Events Managed: | Experienced Feed_22 | - Digital Rights:<br>- Celebrity Details:<br>- Event Ratings:<br>- Broadcaster Details: | - Total Viewership:<br>- Total Amount Earned:<br>- Feedback from Viewers:<br>- Negative Feedback from Advertisers: |
| Name: DEF Shoes<br>- Category: Advertiser<br>- Annual Turnover:<br>- No. of Events Advertised:<br>- Budget Terms:<br>- Type of Events Advertised: | Experienced Feed_26 | - Number of Viewers:<br>- Event Rating:<br>- Event Desc: | - Total number of Websites Hits during the Event:<br>- Number of Broadcasters covering the Event:<br>- Overall Feedback on the Event by Media: |
| Name: Levi Scott<br>- Category: Viewer<br>- Age: 25<br>- No. of Feeds Viewed: 40<br>- Types of Event Viewed:<br>- Twitter Handle: | Experienced Feed_24 | - Cost: USD 30<br>- Event Desc.: Show by Adele<br>- Length : 140 Minutes<br>- Focal View: Lead Singer<br>- Location: Front Row<br>- Broadcaster: VH1 | - Length Watched:<br>- Portion Watched:<br>- Number of Comments on Facebook:<br>- Number of times Focal Area Changed: |

Figure 5

Split of Negative Comments
(as % of feed attribute on which comment was issued)

EXPERIENCE ANALYTIC OBJECTS, SYSTEMS AND METHODS

This application is a continuation-in-part of U.S. patent application Ser. No. 14/020,556, filed on Sep. 6, 2013, which is a continuation-in-part of U.S. patent application Ser. No. 13/912,567, filed on Jul. 7, 2013, which claims priority to U.S. Provisional Application Nos. 61/676,426, 61/676,431, 61/676,436, 61/676,443, and 61/676,452, filed Jul. 27, 2012; 61/675,268, 61/675,263, 61/675,258, and 61/675,271 filed Jul. 24, 2012; and 61/656,619 filed Jun. 7, 2012. These and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is data search and analysis technologies.

BACKGROUND

The background description includes information that may be useful in understanding the present invention. It is not an admission that any of the information provided herein is prior art or relevant to the presently claimed invention, or that any publication specifically or implicitly referenced is prior art.

With growth in technologies that pertain to search of data feeds in the form of videos/text/images or any other format, there is an increasing need to provide or make available data feeds that are relevant in terms of content, timing, length, geography, mandate, context, and also of interest to an entity including but not limited to, broadcaster, event manager, advertiser, and viewer.

Some efforts have been put forth in the domain of real-time data analysis in order to derive meaningful feedback for future actions. For example, CrowdOptic, a maker of crowd-driven mobile solutions for enterprises monitors crowd viewing, photo and video taking behavior in real time and recognizes clusters of phones in the crowd that are focused on the same attraction, thereby giving indications of fan focus and momentum, as well as anomalous activity in the crowd. Unfortunately, CrowdOptic or like platforms do not measure or objectify parameters that would define how viewers or other abovementioned stakeholders experienced or are experiencing various data feeds such as video fees from live events such as soccer matches and rock concerts. Lack of such analysis raises an inability to customize and present feeds of interest and relevancy to such stakeholders. At the same time, any such analysis that does not take into consideration all possible feed attributes and parameters along with metrics that indicate how stakeholders interact with the feeds makes the system inaccurate and unreliable.

U.S. Pat. No. 8,250,616 to Davis titled "Distributed Live Multimedia Capture, Feedback Mechanism, and Network," filed on Sep. 28, 2007 describes presenting a set of videos in real-time, wherein the videos can be organized based on presentation or ranking criteria (e.g., popularity of event, popularity of broadcaster, length of coverage). U.S. Patent Application Publication Number 2009/0063419 to Nurminen titled "Discovering Peer-to-peer Content Using Metadata Streams," filed on Aug. 31, 2007 relates to capturing of content and metadata related thereto and making their access available based on network queries.

U.S. Patent Application Publication Number 2011/0173214 to Karim titled "Crowdsourced multi-media data relationships," filed on Jan. 14, 2010 discloses assembling of coherent media experiences from disparate sources but fails to suggest anything relating to extraction of feed attributes and parameters and further extraction of feed metrics that are based on behavior of a viewer, for example, with a feed, and then compute a metric that indicates and quantifies the mode of interaction and behavior of the viewer with the respective data feed. U.S. Patent Application Publication Number 2011/307623 to George titled "Smooth streaming client component," filed on Jun. 9, 2010 discloses performance of analytics for diagnosing errors and receiving reports related to playback of smooth streaming media and therefore merely focuses on providing feed statistics such as average bitrate of video playback and the amount of time content has been played, without taking into consideration any viewer/advertiser behavioral interaction with concerned data feed.

U.S. Pat. No. 8,036,929 to Reisman titled "Method and apparatus for collecting, aggregating and providing post-sale market data for an item," filed on Mar. 22, 2001 discloses collection and aggregation of post-sale market data (PSMD) from individual consumers regarding products and services, and provision of aggregated post-sale market data for use by consumers in making purchasing decisions. U.S. Pat. No. 8,060,608 to Wang titled "Refined quality feedback in streaming services," filed on May 7, 2004 discloses assessment of quality of a media stream by a user viewing the same and focuses completely on video attributes per se such as jitter duration, frame rate deviation, and synchronization loss. U.S. Pat. No. 8,239,888 of Todd titled "Advertising metrics system and method," filed on Oct. 29, 2009 discloses conversion of audio/video (AV) data into a visual representation of AV stream quality of experience (QoE) based on monitoring and verification of AV stream. U.S. Patent Application Publication Number 2012/0221659 to Brown titled "Content Management System using Sources of Experience Data and Modules for Quantification and Visualization," filed on Jan. 27, 2009 discloses collection of notes and experiences relating to a service shared by a user to provide pre-selections and suggestions based on interests and needs extracted from the collected notes/experiences. Further examples can be found in: U.S. Patent Application Publication Number 2012/0311126 to Jadallah titled "Systems and methods for measuring quality of experience for media streaming," filed on May 30, 2011; U.S. Patent Application Publication Number 2013/0051271 to Cao titled "Quality-of-experience measurement for voice services," filed on Feb. 10, 2011; and U.S. Patent Application Publication Number 2013/0159498 to Funge titled "Measuring user quality of experience for a streaming media service," filed on Dec. 16, 2011 relate to user quality of experience (QoE) relating to streaming media service but have disadvantages of incorporating and implementing a very limited and narrow set of attributes, metrics, and parameters to evaluate the overall experience, which tends to give an inaccurate and incomplete experience metric of one or more data feeds.

Unfortunately, above-mentioned efforts merely aggregate feeds into experience, present quality metrics, or other measures with respect to a subjective experience of a user (e.g., quality) and fail to provide treating analytics with respect to experience objects and generating metrics based on such experience objects. As describes below in the Applicants work, the third party is able to objectively review a consumer experience with respect to one or more feeds.

Thus there is a need for analysis systems and methods capable of reducing experience feeds and data corresponding thereto into meaningful and understandable information by means of experience objects and metrics derived therefrom.

SUMMARY OF THE INVENTION

The inventive subject matter provides apparatus, systems and methods in which one can use an experience analysis system to gain better understanding of how experience feeds are viewed, processed, interacted, created, broadcasted, or otherwise managed.

One aspect of the inventive subject matter includes an analysis system comprising an experience database that stores experience data or information relating to one or more experience feeds. For example, experience data of experience feeds can include feed content; attributes or parameters of experience feeds such as cost, big, location, focal view, and capacity; user data and attributes thereof; and experience feed metrics such as viewers interaction metrics, advertisers reaction metrics, comments on event, feedback on broadcasters, and manager performance metrics, among others.

In another aspect of the inventive subject matter, analysis system can further include an experience feed analysis engine that is operatively coupled with experience database and can be configured to instantiate an experience analytic object based on a rules set implemented on experience data retrieved from experience database. Experience analytic objects can include one or more attributes (along with values corresponding thereto) that define experience, interaction, behavior, feedback, and response of one or more of viewer, broadcaster, event manager, and advertiser in reference to the experience data retrieved from experience database.

In another aspect of the inventive subject matter, attributes and corresponding values of one or more experience analytic objects can be combined to form an experience metric, wherein each experience metric can objectify or define overall experience (such as average number of times focal view was changed, average length for which the experience feed was viewed, etc.) of users (such as viewers, broadcasters, advertisers, etc.) with respect to one or a combination of experience feeds across a plurality of sessions. Experience metric(s) can be presented on output devices for such as computers, printers, tablets, kiosks, cell phones, or any other commercially suitable types of computing devices.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWING

FIG. 5 is a schematic showing an exemplary representation of experience database.

DETAILED DESCRIPTION

Figure 1:
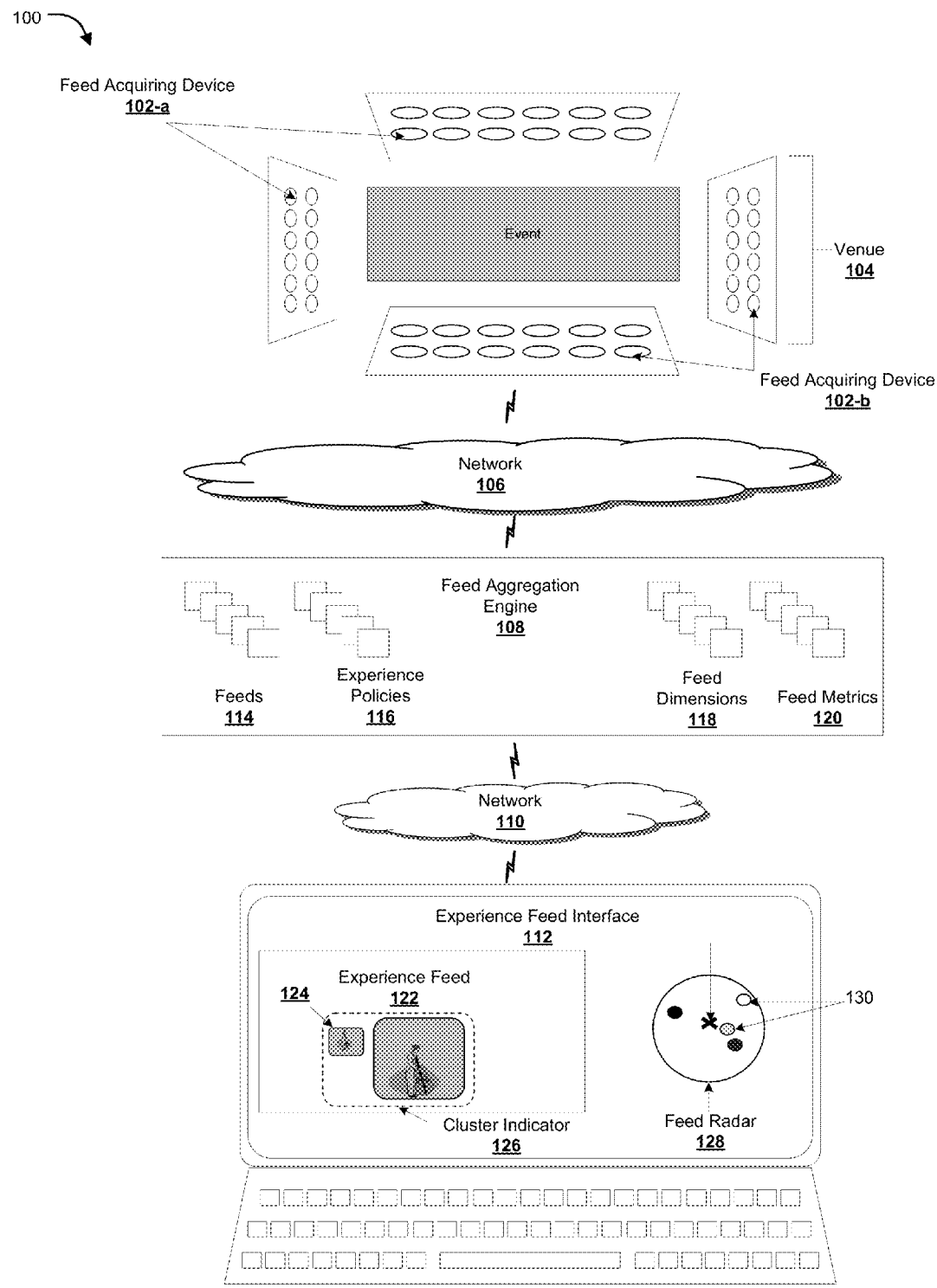
FIG. 1 is a schematic of a remote experience ecosystem.

Throughout the following discussion, numerous references will be made regarding servers, services, interfaces, engines, modules, clients, peers, portals, platforms, or other systems formed from computing devices. It should be appreciated that the use of such terms is deemed to represent one or more computing devices having at least one processor (e.g., ASIC, FPGA, DSP, x86, ARM®, ColdFire®, GPU, etc.) configured to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, the Internet, LAN, WAN, VPN, or other type of packet switched network.

One should appreciate that the disclosed techniques provide many advantageous technical effects including configuring and processing various feeds to determine behavior, interaction, management, and response of users with respect to feeds and implement outcome in enhancing overall user experience while delivering feed content and allied parameters/attributes thereof.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

One should appreciate that the disclosed systems and methods allow better understanding of how experience feeds are viewed, processed, interacted with, created, broadcasted, or otherwise managed. Such better understanding can then enable various stakeholders, including but not limited to, viewers, advertisers, sponsors, managers, and broadcasters, to review feed attributes/parameters and optimize their configuration to achieve desirable metrics. One should also appreciate that the disclosed system and methods allow users to virtually and seamlessly navigate through, or obtain a virtual view from, selected areas within an arena or other geographic location without having to weave through crowds, pay for additional tickets, or even leave their house.

Example scenarios that can benefit from such technology include, among other things, concerts, plays, museums, exhibits, tourism, ticket vendors, movie theatres, social networking, location scouting, fashion shows, or other scenarios.

In FIG. 1, ecosystem 100 illustrates a remote experience interface system configured to generate experience feeds based on defined experience policies and incoming feeds. Contemplated systems include an experience feed interface 112 operatively coupled to a plurality of feed acquiring devices 102-a, 102-b ..., 102-n, collectively referred to as feed acquiring devices 102 hereinafter, through a feed aggregation engine 108. Plurality of feeds acquired by devices 102 can be sent or otherwise transmitted over a network 106 (e.g., Internet, cellular network, LAN, VPN, WAN, parts of a personal area network, etc.) to a feed aggregation engine 108 that is preferably configured or programmed to aggregate the plurality of feeds 114 from multiple venues (such as venue 104) into one or more experience feeds 122 based on one or more experience policies 116, and possibly other feed metrics 120, feed dimensions 118, terms, among other factors. Experience feeds 122 can then be transmitted to one or more devices (e.g., computers, tablets, game consoles, game handhelds, cell phones, appliances, vehicles, etc.) over a network 110 for presentation via an interface e.g., 112.

One should appreciate that disclosed technology can allow a user to virtually experience an event being held at a venue, for example a rock concert or a sporting event, which he would otherwise not have access to, through reception of video feeds obtained from devices located in proximity to the event. It is contemplated that experience feeds 122 can be constructed not only from video feeds, but additionally or alternatively also from original or modified audio data, image data, textual data, time data, location data, orientation data, position data, acceleration data, movement data, temperature data, metadata, user data, or any other suitable sensor data acquired by feed acquiring devices 102 having one or more corresponding sensors (e.g., a mechanical sensor, a biometric sensor, a chemical sensor, a weather sensor, a radar, an infrared sensor, an image sensor, a video sensor, an audio sensor, or any other commercially suitable sensor that can construct or acquire sensor data). Contemplated feed acquiring devices 102 can include, among other devices/equipments, a mobile phone, a smart phone, a camera, a tablet, a video camera, virtual reality glasses, a security camera, a computer, a laptop, or any other suitable feed acquiring device.

Experience feeds 122 can, for example, be configured to represent a set of video feeds that match one or more criteria (defined by experience policies 116) defined by viewers, where such criteria can include type of feeds to be presented, time for which feeds are to be presented, portions of feeds that are not to be displayed, angle or focal area using which feed is to be viewed, position in venue 104 from where feed is to be viewed among other such feed based attributes and parameters. Experience policies 116 therefore act as filters that process and/or modify multiple incoming feeds received from feed acquiring devices 102 to generate experience feeds 122.

Individuals or entities controlling feed acquiring devices 102 can be considered as broadcasters of an event. Event broadcasters can utilize feed acquiring devices 102 to acquire videos or other sensor data related to one or more focal zones of an event. Once various feeds of video or other data are aggregated by feed aggregation engine 108, feeds can be modified or curated for presentation in experience feed 122 based on experience policy 116.

An experience policy 116 relating to an event preferably includes event attributes, commands and other terms that can dictate how an experience feed is to be constructed. It is contemplated that an experience policy 116 can be generated by one or more persons or entities, including for example, a viewer, a system or event manager, a broadcaster, or a conflicts manager. Where multiple persons or entities contribute to generation of an experience policy, it is contemplated that data relating to some or all of the terms (e.g., rules, commands, costs, fees, subscriptions, bids, etc.) can be transmitted via one or more interfaces to a policy generation module (not shown) for generation of experience policy 116. One should appreciate that experience policy 116 can also be generated automatically based on viewer profile, interest, activity history among other factors, which may also extend to features defined by broadcasters, advertisers, and/or event managers.

One should appreciate that incoming feeds 114 (whether aggregated or individual) or experience policies 116 can be utilized to derive one or more feed dimensions 118, which can provide a description of data contained therein. Feed dimensions 118 can also be derived based on the context (e.g., data acquired in feeds suggests that some feeds includes loud audio while others only contain video, etc.), or based on a known input that is received by a policy generator. As an example of a known input, an experience policy 116 may include a user input term suggesting a preference for a front row view of a lead singer in a band. Such terms can be used to derive, among other things, a location dimension or a focal dimension.

Other contemplated feed dimensions 118 can include, for example a time dimension, a point of view dimension, a capacity dimension, a relevancy dimension, a proximity dimension, a relationship dimension, a rating dimension, an emotional dimension, a sensory modality dimension, a color dimension, a volume dimension, or any other suitable category of data that may be of relevance in generating an experience feed 130. One should appreciate that feed dimensions 118 can also be included as part of experience policy 116, wherein varied feed-viewing based dimensions (such as leftmost seat in middle row with focus on leftmost guitarist) can be implemented as filters defined in experience policy 116.

Feed dimensions 118, aggregated feeds 114 from devices 102, or experience policies 116 can be used to generate or calculate one or more feed metrics 120 associated with an experience dimension, which can provide a value associated with the dimension. Contemplated metrics can include, for example, a location metric (e.g., GPS coordinate value; physical address; zip code; a centroid of devices, friends, celebrity or venue; etc.), a focal metric (e.g., coordinates associated with a central point of view, a tilt, a rotation, an angle, etc.), a time metric (e.g., a time of day, a length of feed, an estimated time of arrival or start, etc.), a capacity metric (e.g., a venue capacity value, a percent to capacity value, etc.), an experience feed arrangement metric (e.g., primary feed location, primary feed size, etc.), a relationship metric (e.g., a distance between broadcasters, a ranking of the most popular videos, etc.), a relevancy metric (e.g., a percentage of user preferences met by a video feed, etc.), a proximity metric (e.g., a distance to a focal zone, a distance to a person, etc.), an emotion metric (e.g., a number of smiling people, a percentage of smiling people, a color, brightness, etc.), or any other suitable metric. One should appreciate that multiple values or types of values can be associated with a single dimension, and that a single value can be a metric of one, two, or more dimensions. One should also appreciate that experience policy 116 can be configured to include both, feed dimensions 118 and corresponding feed metrics 120, and form a single consolidated data structure comprising multiple expected attributes/parameters in incoming feeds along with their filtering values to help extract final set of feeds (which would constitute experience feeds 122) for presentation on output device(s).

In some preferred embodiments, feed aggregation engine 108 can be configured to construct an experience feed 122 having an arrangement of a primary feed and a plurality of peripheral feeds according to an experience policy 116. Experience feed 122 can also be constructed to have an arrangement of feeds based on one or more feed metrics 120. For example, a preferred location and a preferred focal point can be input by a user, broadcaster, or manager and used to generate a location metric and a focal metric for constructing experience feed 122.

In the example provided above, experience feed 122 is presented with a primary feed 124A and peripheral feeds such as 124B having an arrangement according to at least one of the experience policy 116, location metric, and focal metric. In especially preferred embodiments, a "primary feed" can comprise one or more feeds that best match the totality of terms included in experience policy 116 and feed metrics 120. In FIG. 1, primary feed 124A may be captured by feed acquiring device 102 as the stream that best matches combination of attributes defined in experience policy 116 and "feed dimensions 118—feed metric 120" mapping. Feed 124B, on the other hand, may be captured by another feed acquiring device to provide best match for another set of experience policy 116 and "feed dimensions 118—feed metric 120" mapping. However, feed 124B could be considered peripheral because it provides a weak match for the current set of attributes/parameters defined in experience policy 116.

Experience feed 122 can also advantageously include a cluster indicator 126 generated as a function of a focal metric. Cluster indicator 126 can comprise a visual or non-visual indicator of the feeds that provide an indication of a match (e.g., best, worst, etc.) to focal metric or any other dimension 118 or metric 120. In the example shown, focal cluster 126 is a visual box surrounding feeds 124A and 124B whose focal zones best match preferred focal point. However, other possible visual indicators include a color, an image, a video, a symbol, a text, a number, a highlight, a change in size, or any other suitable visual indicator. Possible non-visual indicators include a sound, a voice, a signal, a smell, or any other suitable non-visual indicator. It is also contemplated that cluster indicator 126 can be generated as a function of two, three, or even four or more dimensions, metrics or terms. Furthermore, cluster indicators can be generated as a function of one or more non-focal dimensions or metrics (e.g., a time cluster shown as a clock can be generated as a function of a time metric, a location cluster shown in a red block can be generated as a function of a time metric and a direction of view metric, etc.).

It is also contemplated that feed radar 128 can be presented to a user to provide a simple or consolidated presentation of feed data. Feed radar 128 can show a relative location of peripheral feeds in relation to a primary feed. Feed radar 128 can also advantageously present an indication of other information related to the feeds, for example, a focal zone, a direction of view with respect to the focal zone, a time, a quality, a capacity, a capability, a volume, or a compliance with a set of terms. In the example provided, radar 128 provides an indication of where each feed acquiring device is located with respect to preferred location (e.g., 130). Radar 128 also provides an indication of how closely the devices' focal zones match a focal preference. In this example, the indication is provided through variation in shading of circles representing the devices. Other suitable indications include a difference in sizing, color or symbol; a boxed portion; an image; text; or any other suitable indications.

Figure 2:
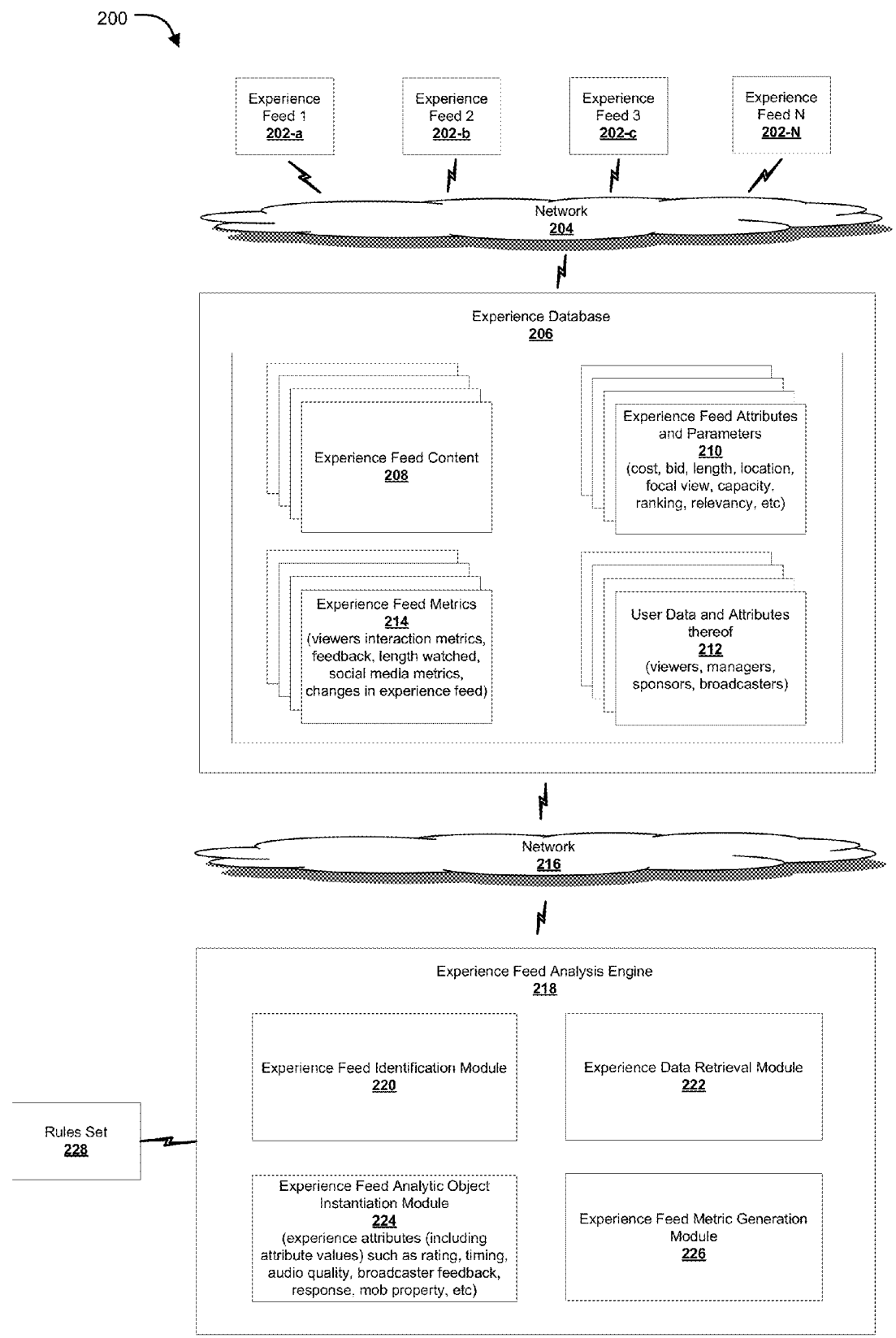
FIG. 2 is a schematic showing generation of experience feed analytic object and experience metric.

FIG. 2 illustrates a schematic 200 showing generation of experience feed analytic object and experience metric based on rules set and experience feeds. As described above with reference to FIG. 1, experience feeds depict the mode and manner in which a viewer views and/or experiences selected feeds, a broadcaster broadcasts selected feeds, an event manager handles and conduct the events that generate one or more experience feeds, and an advertiser amalgates its advertising campaign to achieve desired outcomes. For example, an experience feed can indicate time for which a viewer viewed a feed, portions watched, comments posted on various social networking sites while and/or after watching a feed, changes done with respect to focal view and location from where feed was viewed, interaction with advertisers, among other attributes that can help gauge the experience or the impact that concerned experience feeds had on the user/viewer. Experience feeds therefore, not only include the feeds selected based on experience policy per se, but also include varied customizable parameters and attributes that can help any stakeholder and/or user to change the manner in which the feed is experienced or interacted with. With respect to schematic 200, one should appreciate that experience feeds such as feed 1 202-*a*, feed 2 202-*b*, feed 3 202-*c*, . . . , and feed N 202-*n*, collectively referred to as experience feeds 202 hereinafter, can relate to a single event or a combination of varied events such as different sporting events, music concerts, product launches, live plays, among other similar events.

With respect to FIG. 2, a plurality of experience feeds 202 can be operatively coupled with an experience database 206 through network 204. Experience database 206 can be configured to store experience data that, not only comprises content that pertains to experience feed, but also includes attributes, parameters and metrics that relate to the experience feeds 202. Database 206 can be configured to store experience feeds 202 in a defined and customizable manner that is efficient for processing and retrieval of feedback. In one example, all feeds pertaining to different events, held at different times, geographies, and zones, can be stored together in experience database 206 to form experience feed content 208. In another example, content of experience feeds 202 can be categorized based on context of feed, time of generation/broadcast, type of feed (music, sport, etc.), theme, length, geography, rating, viewership, among other parameters and each feed 202 can then be stored based on its category to form experience feed content 208. In yet another example, one or more experience feeds 202 for each event can be stored together and tagged in order to make it easier for retrieving all feeds 202 that pertain to a single event for example the finale of FIFA World Cup. Such different feeds for a single event can also include feeds having different focal views, location-based perspectives, color schemes, advertising patterns, broadcasters, peer-audience, among other attributes and therefore aggregation of different experience feeds relating to a single event would give an indicator of how different users viewed the same event and how they experienced/interacted with the feeds.

Experience database 206 can further be configured to store experience feed attributes and parameters 210, wherein feed attributes and parameters 210 can help define various properties of experience feeds 202. Few exemplary feed attributes and parameters 210 can include cost of feed (which can be different for multiple broadcasters, patterns, presentation settings), bids issued by various stakeholders, length of feed, possible locations from where feed can be viewed (such as front row, center row, left side of last row, among others), feed ranking (which can be different based on ranking bodies), venue capacity, possible focal views, broadcaster details, event manager details, relevance to personal interests, among many other attributes that can be experienced or configured while viewing a given feed 202. One should appreciate that experience feed content 208 and experience feed attributes and parameters 210 can be operatively coupled with each other, wherein content 208 can be configured to store actual feed output, and attributes and parameters 210 of experience feed can help configure how a feed can be viewed, experienced, or interacted with.

Experience database 206 can further include experience feed metrics 214 that are operatively coupled with attributes and parameters 210 and feed content 208, wherein experience feed metrics 214 can be configured to store and/or objectify how users including viewers, advertisers, event managers, and broadcasters, among others, interacted with, viewed, reacted to, and experienced the feeds 202. For example, one or more experience metrics 214 can be defined or evaluated for each feed 202 and configured to indicate interactivity pattern and behavior of a plurality of viewers who watched the feed 202. For example, metrics 214 can include viewers interaction metrics (such as number of times focal view changed, number of times location changed, portion of feed not viewed, type of attributes and parameters 210 changed during the feed 202), feedback on feed 202 (such as rating given to feed, comments on social media, recommendations given to peers), length of feed watched, social media metrics (such as status updates on feed, rating given, comments written, number likes/dislikes), and changes done in experience feed (such as color settings changed, audio/video settings re-configured), among other like metrics.

Experience feed metrics 214 can be a combination of objective and subjective evaluation outputs of experience feeds 202. For example, number of times the focal view of a feed was changed can be an objective measure of say, 6, whereas type of comments posted on Facebook® can be a subjective measure that can be analyzed, manually or automatically, to evaluate the kind of feedback that a viewer had on a particular feed. One should appreciate that feed metrics 214 can be computed for a combination of experience feeds 102, users, groups of users, types of users, among other possible entities or combination thereof. For example, values associated with attributes and parameters 210 of multiple experience feeds 202 can be combined to generate one or more metrics 214 for a given video feed that was viewed differently by different users. To illustrate, for a group of say 5 users who viewed a given video feed at different locations and configured respective experience feeds with different attributes and parameters 210, feed metrics 214 can be processed together to generate statistics of how the group together interacted and responded to the feed. Such metrics can give outcomes such as average number of times focal view was changed, type of comments posted by viewers, average viewed length, most viewed portion, among other like metrics. Similarly, attributes and parameters 210 of different experience feeds 202 can also be combined together to generate a defined number of metrics that represent the type of content, or geography from where the content has been generated, amongst other applicable and appropriate metrics.

One should appreciate that experience feed metrics 214 can also be generated by entities such as broadcasters, managers, sponsors, and advertisers based on their interactions with respective experience feed(s) 202. For example, an advertiser can associate values to feed attributes and parameters 210 based on its experience with the experience feed 202 such as positioning of advertisements, number of times advertisements broadcasted, impact on sales, among others.

Experience database 206 can further include user data and attributes thereof 212, where user data and attributes 212 can include details of viewers, broadcasters, advertisers, event managers, among other stakeholders in the process. Such user data and attributes 212 can be associated with one or a combination of experience feeds 202 such that, for each feed 202, concerned stakeholders and information related thereto can easily be fetched. Similarly, one or more experience feeds 202 can also be associated with data and attributes 212 of each user, such that feeds that the user participated in can be extracted and processed for further action. According to one embodiment, depending on user in context, user data and attributes 212 can include identifiers associated therewith. For example, for a viewer, email address, location address, social media handles, activity interests, demographic profile, among others can be stored. Similarly, for a broadcaster, number of events broadcasted, type of events broadcasted, revenue projections, user feedback, cost/bidding history can be stored.

One should appreciate that experience data, referred to in the present disclosure, should be perceived as all or any part of data stored in experience database 206. For example, experience data can include feed content 208, feed attributes and parameters 210, and feed metrics 214 of one experience feed 202 or a combination of different feeds pertaining to one event or an amalgamation of varied events across one or multiple categories. In another example, experience data can include user data and attributes thereof 212 relating to experience feeds 202 in context. For the purpose of illustration, experience data can be construed as any data pertaining to a given experience feed including user data of users that are directly or indirectly associated with the respective feed.

Experience database 206 can be operatively coupled with an experience feed analysis engine 218 through a network 216, wherein engine 218 can be configured to, based on an input rules set 228, instantiate, for one or more experience feeds 202 and corresponding experience data retrieved from database 206, at least one analytic object that represents interaction, in any form or manner, of concerned users with the one or more experience feeds 202. Interaction between users (combinely representing viewers, broadcasters, event managers, and advertisers) and experience feeds 202 can include any change in feed attributes and parameters 210 done by users; experience of users before, while, and after the experience feed; feedback on content, mode of presentation, performance, and other factors that users had; among other aspects. Object instantiated based on experience feed 202, experience data, and interaction between feed 202 and users, can be semantically defined by object characteristics including actions taken by users and occurring on experience feeds, attributes, values of attributes, and relations that needed to incorporate feed attributes and parameters 210 and metrics 214 into the object.

One should appreciate that an analytic object is session based and can be instantiated for each user based on feed 202 experienced by the user during the session and further based on metrics 214 and attributes and parameters 210 generated by the experience. It should also be appreciated that a single object can also be instantiated for multiple sessions comprising representation of data that relates to a plurality of experience feeds 202 viewed by different users for same event. In another embodiment, an object can also be instantiated for a combination of experience feeds 202 pertaining to different events viewed by a single or a distinct set of users. Analytic object can therefore be generated from a data model constructed by experience data that is retrieved from experience database 206, where the experience data contains related actions, entities, relationships, and reusable usages of the object. Reusable usage can relate to how a given experience feed 202 is presented and viewed by users.

Analytic objects can be instantiated from a plurality of object classes, where each class can define a set of characteristics inherent to each object in that class. For instance, a given class can be configured to determine experience of a viewer with respect to three soccer matches seen by the viewer on three consecutive days. Each match, in the form of an experience feed, can be viewed by the viewer giving rise to attributes and parameters 210 and metrics 214 corresponding thereto. Experience data for each feed can then, based on a defined rules set, be used to generate three objects of above defined class, wherein each object, if needed, can communicate with another object by calling one another's capabilities or "methods".

According to one embodiment, rules set 228 can be configured to define parameters and/or criteria on the basis of which experience data retrieved from experience database 206 is processed to generate analytic object(s). Rules set 228 can be generated from a search query that defines one or more parameters based on which experience feeds 202, including their attributes and parameters 210 and metrics 214 can be filtered and then instantiated into objects. Rules set 228 can also include user data or part thereof as a parameter for filtering experience data so as to get desired part of overall experience data for representing actual user behavior, interaction, and feedback on the filtered part of the experience data. In one example, rules set 228 can include a condition configured to filter out and identify "experience feeds of user having identifier "user_id34523" such that identified experience feeds relate to baseball matches played in Chicago". Portions or segments from within experience feeds can also be extracted by rules set such as "identify and aggregate last 10 minutes of concerts conducted by Metallica from 1 Dec. 2009 to 21 Sep. 2012". Likewise, rules including experience feed context based rules, advertisement based rules, ranking based rules, location based rules, focal area based on rules, among others can also be implemented to extract desired experience data.

According to one embodiment, experience feed analysis engine 218 comprises experience feed identification module 220, experience data retrieval module 222, experience feed analytic object instantiation module 224, and experience feed metric generation module 226. One should appreciate that above mentioned modules are exemplary in nature and can be divided into sub-modules or combined together. Additional modules can also be implemented to incorporate additional features defined in the instant disclosure and therefore are within the scope of the present application.

Experience feed identification module 220 can be configured to identify a collection of experience feeds 202 representing an aggregated experience of a user. As mentioned above, reference to a "user" in the present application incorporates reference to any stakeholder, including, but not limited to, viewer, advertiser, broadcaster, sponsor, or event manager. Identified experience feeds 202 can, in an example, relate to a single event feed viewed by a user through the different experience feeds by change in attributes and parameters 210 such as change in position, focal view, broadcaster, color combination, viewing pattern, zoom-in setting, among other like settings. In another aspect, identified experience feeds can also relate to feeds from different events such that an aggregated experience can be computed for a given user, which, for example, can help understand the kind of feeds user likes, user's interests, portions of feeds most viewed, viewing settings, social media interaction pattern, among other like user attributes.

According to one embodiment, experience feed identification module 220 can also be configured to identify a collection of experience feeds representing an aggregated experience of a group of users. For instance, an object of the instant disclosure may be to construct a feedback and experience that all viewers of a particular event feed had, in which case, module 220 can collect and aggregate experience feeds for particular event feed in context from all viewers of the event feed. Any other combination of users and experience feeds can also be implemented by module 220 so as to extract the desired set of experience feeds that match expected behavior or yield interaction to be measured/assessed.

Experience data retrieval module 222 can be configured to retrieve experience data (from experience database 206) that corresponds to each member of the collection of experience feeds identified by experience feed identification module 220. As each experience feed 202 has its data in terms of feed content 208, attributes and parameters 210, feed metrics 214, and respective user data and attributes 212 stored in experience database 206, once the collection of experience feeds has been identified (by module 220), retrieval module 222 can extract experience data corresponding to the identified experience feeds. For instance, in case five experience feeds relating to a "Jack Williams" concert have been identified and aggregated, retrieval module 222 can retrieve feed content relating to the actual performance during the concert; attributes and parameters such as length, capacity, ranking, relevancy relating to the content; details of user data and attributes 212 that broadcasted, managed, advertised or viewed the feeds or were a part thereof; and metrics 214 giving interaction indicators with respect to the experience feeds such as average number of times watched, portion having highest hits, frequency of advertisement display, portions of advertisement display, interruptions during broadcast, among other metrics 214.

Experience feed analytic object instantiation module 224 can be configured to process experience data retrieved by experience data retrieval module 222 with respect to rules set 228 to instantiate an experience analytic object. Instantiated analytic object can be configured to represent experience data, filtered or processed (including modified) based on rules set 228, in a manner such that the object defines the collected experience feeds and how users interacted, behaved, processed, or commented on the feeds. Instantiated analytic object can further be configured to reflect a response or reaction of a defined set of users to an identified set of experience feeds. According to one embodiment, instantiated object can be based on commercially available examples of object-based frameworks such as MICROSOFT®.NET™ framework (Redmond, Wash.), Mono, Java®, etc., which provide a set of extensible object classes, with each class encapsulating a module of reusable code and associated data structures. Object classes can be used to instantiate object instances for use in by a program, script, etc.

Instantiated analytic object can comprise a number of attributes and values corresponding thereto. Such attributes can help define one or more experience feeds and/or users and the mode and manner in which they view feed content and process such content in terms of rating, comments, viewing parameters, etc. Attributes of instantiated object can also be configured to represent interactions of advertisers or event managers with selected set of experience feeds. For example, attributes pertaining to digital rights, celebrity details, event ratings by various recommended rating agencies, and broadcaster details, etc. can be defined for an event manager, which can be correspondingly set with values to assess identified experience feeds with respect to the defined attributes. According to one embodiment, analytic objects can be stored in experience database 206 or in any other different repository.

One should appreciate that although present exemplary implementations are being described with respect to session-based object instantiation that involves an object being instantiated for a given user session of an experience feed that pertains to a defined event feed, objects can also be instantiated for an aggregate set of different experience feeds, where such objects can combinely represent interactions and usage of experience feeds by concerned stakeholders within the aggregate set. Such objects and methods incorporated therein can also be configured to compare different experience feeds and help assess points of interest, viewership patterns, reasons for to change in viewership, social media impact, among other like factors.

One should appreciate that attributes of an instantiated object may be different across users. For example, for an advertiser, primary objective may be to evaluate the impact of advertisements on target audience during and after presentation of experience feeds, whereas, for a broadcaster, the primary objective of processing and assessing objects instantiated from experience data may be to evaluate change in viewership, quality of broadcast, effectiveness in bidding process, competitors, among other like factors. Even within a defined category of users, say viewers, attributes may differ, as few of them may be more active on feedback/ranking forums whereas others may be more concerned with content presentation/viewing formats.

Experience feed metric generation module 226 can be configured to generate an experience metric based on one or more attributes and values of an experience analytic object. Experience metrics can be configured to associate objectivity with perception, experience, and interaction of users with experience feeds and showcase a defined and measurable impact of identified experience feeds on stakeholders, in order to enable further actions to be taken. According to one embodiment, experience metrics can include objectively computed metrics such as actual length watched, average number of tweets per viewer during presentation of experience feeds, average number of hits per minute during presentation of experience feeds, among other appropriate metrics. According to another embodiment, experience metrics can subjectively represent the level of interaction, response, and behavior of users towards identified experience feeds. For instance, a first metric can reflect broadcaster's perception of experience feeds, whereas a second metric can typecast comments from various groups of users to understand nature of emotional outcome that users felt during or after display of experience feeds, and a third metric can indicate quality of experience feeds with respect to clarity, contrast, color combination, among other factors.

According to one embodiment, metrics can take on different and varied representations depending on user in context, experience feeds 202 in reference, conditions put forward by rules set 228, among other parameters. Multiple metrics relating to one or more event feeds can also be operatively coupled with each other to help understand viewing pattern, advertising pattern, relative ranking of various related or distinct feeds, trends of social media interaction, among other desired objectives. In one example, metrics can simply involve a listing of various interaction or experience based factors and their values retrieved based on objects instantiated by module 224, whereas, in another example, metrics can involve evaluation of each attribute and value of one or more objects and draw conclusions, models, recommendations, among other statistical derivations to help understand underlying problems, interaction pattern, response pattern to feed content, among other derived aspects.

According to one embodiment, metrics can be single valued or multi-valued depending on number feed dimensions being represented by a given metric. Metrics can focus on evaluating and representing patterns ranging from independent actions such as mode of feed request by viewers, creation of feeds by multiple broadcasters, bidding process, transaction process, quality of feed, mob properties, to inter-related actions such as change in viewership patterns, change in number of hits on advertisers webpage with respect to experience feed, among others.

Analysis of metrics can further enable concerned stakeholders to map value that experience feed brings to them. For example, reviewing costs, bids or other transactions through computed metrics can help determine a value for broadcast content. Metrics can further enable determination of points of interest, most preferred focal point, perception that different users create about their direct or indirect interaction and behavior with experience feeds, critical mass on experiences that users have with one or a combination of feeds, among other like patterns.

Figure 3:
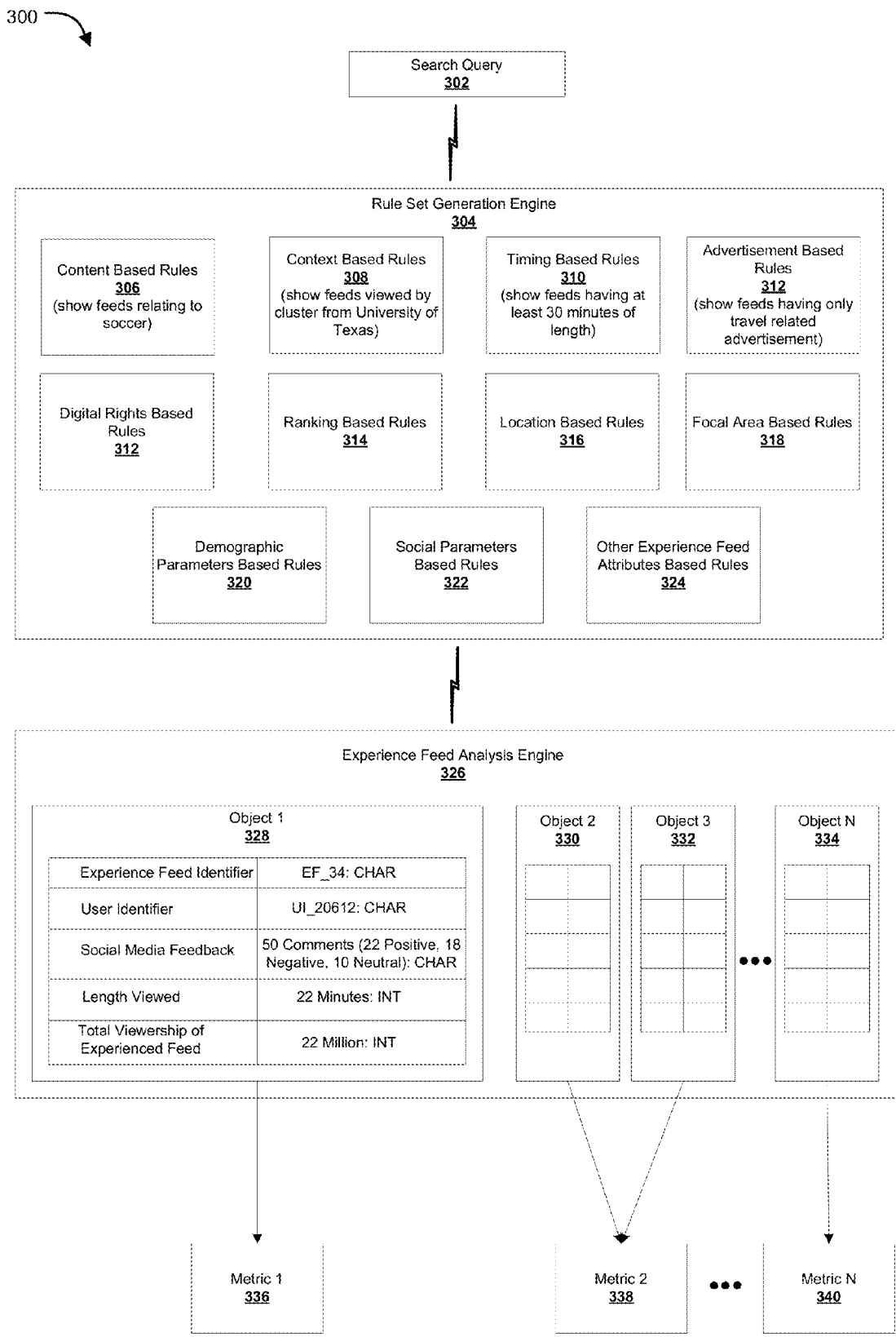
FIG. 3 is a schematic showing generation of rules set and experience feed analytic objects.

FIG. 3 is a schematic 300 showing generation of rules set and experience feed analytic objects in accordance with an embodiment of the present application. As mentioned above in FIG. 2, an analytic object can be instantiated based on experience data retrieved from experience database and rules set, wherein rules set can be configured to define parameters that filter identified experience data to extract relevant and desired experience data and also, if needed, modify or change representation of the experience data to enable efficient and accurate object instantiation.

According to one embodiment, rules set (shown as 228 in FIG. 2) can be generated through a rule set generation engine 304 by processing an input search query 302 with respect to one or more rules (306-324) that are stored in at least one database. Search query 302 can be configured to incorporate parameters through keywords to enable retrieval of only desired part of experience data that meets experience feed representation required for analytic object instantiation. For example, a search query 302 can be as simple as "identify experience data relating to a group of users having identifier usergroup_id_2156 such that the experience feeds to which the experience data relates should have an average of at least 3 changes in focal view during their presentation". In another example, a search query 302 can include parameters that focus on changing representation of experience data such that finally processed experience data is in desired format and complies to a defined standard. Editing experience feeds, changing zoom-in settings, are few of such examples.

Search query 302 can be input by any user and/or stakeholder based on type of experience data that he/she wishes to process and analyze. Search query 302 can also be generated automatically based on profile of concerned user. For example, for an event manager, overall response for an event, timing of the event including each part thereof, coordination between organizers and performers, are key issues of importance and hence their search query may be inclined towards extracting experience data that gives answers to above mentioned mandates. One should appreciate that as experience data can be construed to be a combination of feed content, attributes and parameters, user data, and feed metrics, any part of such experience data can be retrieved. For example, it may be possible that search query is configured to retrieve data only pertaining to location and focal area based attributes and not others.

In an implementation, search query 302 can be given as input to a rule set generation engine 304, where the engine 304 can be operatively coupled to and/or include a plurality of different types of rules that are based on feed content, feed context, feed attributes, feed parameters, user data and attributes, and experience feed metrics, among other factors. Such rules can either be stored in a different database(s) or can be stored within the internal memory of engine 304. In an implementation, engine 304 can execute a search routine that processes input search query 302 to generate desired rules set.

Rule set generation engine 304 can include a plurality of rule databases that can be categorized based on experience feed properties such that, based on input search query, only the required rule repositories are fetched for generation of rules set. Engine 304 can include content based rules that aim to extract attributes that relate to actual performance or content of event feed. For example, content based rules repository 306 can define multiple conditions or criteria relating to performers involved in feed, activities that took place in the feed, duration of each such activity, type of feed, among other like rules. Engine 304 can likewise include context based rules 308 that can be based on type of viewers, event location, time of day, external events directly/indirectly impacting event in reference, among other factors.

Engine 304 can further include timing based rules 310 that can include conditions based on timing of event or any portion thereof. Rule repository 310 may therefore include a criterion such as "show feeds having at least 30 minutes of length" or "show last 10 minutes of experience feed having identifier "feed_id3436456". In an exemplary embodiment, each such criterion or any other representation thereof can be associated with unique identifiers, which can be selected based on input search query 302 to generate rules set. For instance, rules across different repositories can be associated with identifiers such as rule_id-1, rule_id-2, . . . rule_id-N, which can then, based on search query 302, either automatically or manually be processed to generate a modified set of rule identifiers that make part of rules set (element 228 of FIG. 2).

Engine 304 can further include advertisement based rules 312 giving conditions relating to type of advertisement, frequency of advertisement, positioning, target audience, advertisers profile, impact on sales, among like rules. Likewise, other rules can include digital rights based rules 312, ranking based rules 314, location based rules 316, focal area based rules 318, demographic parameters based rules 320, social parameters based rules 322, among other experience feed attributes based rules 324. Rules can also be categorized based on type of user involved in instantiation of object(s), intent behind generation of experience metric(s), type of experience feed(s), and other parameters.

Search query 302, in the form of rules set, can be operatively executed on experience feed analysis engine 326 (corresponding to element 218 of FIG. 2) to filter retrieved experience data that is desired to be analyzed for instantiation of analytic objects such as object 1 328, object 2, 330, object 3 332, . . . , and object N 334. As mentioned above, objects 328-334 can be configured based on experience data relating to one or a combination of different experience feeds of same or different events. Objects can include a plurality of attributes and corresponding values that may, on one hand, relate to one or more users interacting with a single experience feed, or, on the other hand, relate to a single user interacting with multiple experience feeds.

With respect to FIG. 3, object 1 can include a plurality of attributes that define user(s) characteristics including how the user interacted with, changed parameters/attributes of, felt and valued, and experienced event feeds. For example, attributes, as illustrated, can include "experience feed identifier", "user identifier", "social media feedback", "length viewed", and "total viewership of experience feed". Each attribute can be accompanied with a respective value that helps evaluate the attribute and the instantiated object in totality. As can be seen, for an attribute relating to social media feedback, there were 50 comments from the user in context having identifier UI_20612, of which 22 comments were positive, 18 were negative, and 10 were neutral. Likewise, numerous other defined and customizable attributes can be incorporated in a given instantiated object. Each value can be characterized by the type and form of data it represents such as INT, CHAR, FLOAT, BOOL, among others.

Instantiated objects can represent how, for example, a broadcaster, perceived the event to have gone through, how their relationship with event manager worked, quality of broadcasting, revenues per second/minute/hour that the broadcaster earned during the event, among other perception-generating attributes. Objects can also be considered for quantifying classes of experiences based on review of historical events with or without comparison with events corresponding to filtered set of experience feeds. Attributes of objects can be modified if desired even at run-time so as to enable efficient generation of experience metrics based on one or a combination of objects. For example, one attribute of an object instantiated with respect to an event manager can include crowd focus, which can indicate parts of the event where the audience/crowd, in real-time, was focusing most on. Such crowd focus can be computed as a time differential to understand pattern of change in focus with respect to time and activities happening in the event during each such time instant. Processing of "crowd focus" attribute with respect to time, feed activity, type of audience, among other parameters can help achieve metrics that can define audience mindset, reaction sensitivity, perception indicative factor, among other psychological parameters.

One should appreciate that even though, in the present disclosure, users have been defined as stakeholders including viewers, sponsors, advertisers, event managers, and broadcasters, any other stakeholder such as security/police agencies, ranking agencies, media agencies, are also a part of the proposed system and can therefore clearly be included to instantiate objects, input search queries, generate experience metrics, and generate rule set. For example, a security agency can define search query relating to type of security measures, changes in settings of surveillance equipments, configuration of security forces during each part of the event, among other like search parameters.

Experience objects can also be compared, managed and updated in real-time with respect to other objects. As instantiated objects relate to one or more experience feeds and may correspond to each session of a user, each object may be interlinked with one or more other objects, allowing changes in configuration, attributes and values of objects based on changes in other connected objects.

Further, with respect to FIG. 3, one or more objects can be combined and coupled with each other to form experience metrics such as metric 1 336, metric 2 338, . . . , and metric 3 340, wherein, in an exemplary implementation, metric 1 336 is based on object 1 328, and metric 2 338 is based on a combination of objects 2 and 3. Such combination of metrics can help understand actual experience of concerned users with respect to identified experience feeds. As different objects such as objects 2 (330) and object 3 (332) may relate to a single experience feed viewed by different users, combination of instantiated objects into a single metric enables assessment of overall feedback on the concerned experience feeds from different perspectives.

Figure 4:
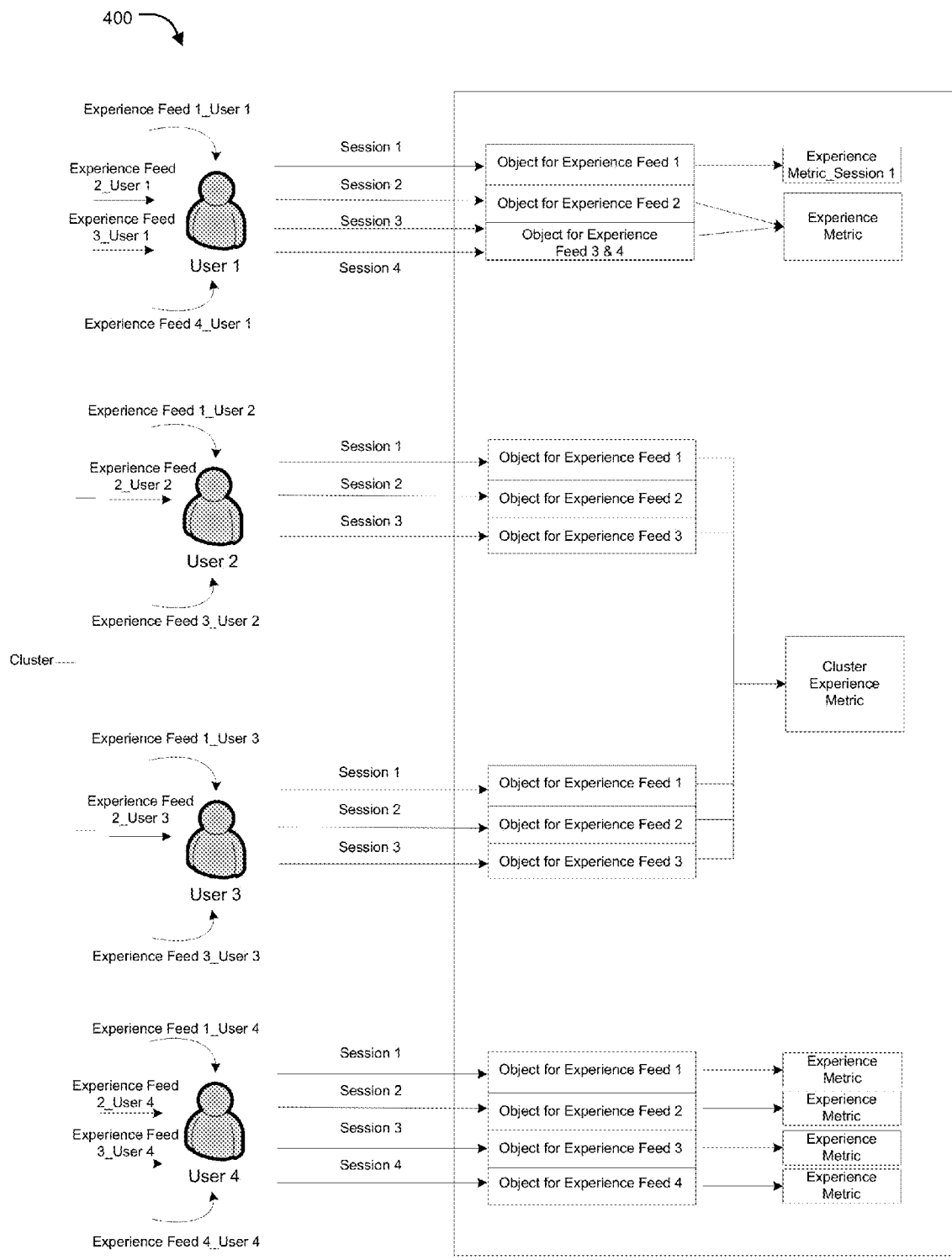
FIG. 4 is a schematic showing generation of session-based experience feed analytic objects and experience metrics.

FIG. 4 is a schematic 400 showing generation of session-based experience feed analytic objects and experience metrics. As would be seen in the forthcoming disclosure, one or more sessions can be combined in varied formats to generate a plurality of analytic objects using experience feed analysis engine (element 326 of FIG. 3). Post instantiation of objects, one or more objects can be operatively coupled with each other to generate experience metrics, which can, either correspond to single session or to a combination of sessions or parts thereof.

FIG. 4 illustrates a mechanism of instantiating objects and subsequent generation of experience metrics for a plurality of users such as User 1, User 2, User 3, and User 4, where User 2 and User 3 form a cluster of users such as a group of students in a university, a group of sport enthusiasts, among other like clusters. As shown in representation 400, User 1 views and/or interacts with four experience feeds Experience Feed 1_User 1, Experience Feed 2_User 1, Experience Feed 3_User 1, and Experience Feed 4_User 1, which are experienced through four respective sessions. In an embodiment, each experience feed can either be for different events or for a single event with different event parameters/attributes such as location, focal view, zoom settings, among others. Feeds can also be a combination of above mentioned possibilities, wherein three of the four feeds can pertain to a single event and the last feed can relate to a different event. In yet another embodiment, feeds can also be for a single performance across four different cities and therefore held at different time zones/periods.

Once viewed and/or processed, identified experience feeds can be processed by analysis engine to instantiate objects based on rules set, experience feed metrics, experience feed attributes and parameters, user data and attributes, and experience feed content, or a combination thereof, wherein instantiated objects, including attributes and values corresponding thereto, indicate overall interaction or behavioral pattern of any given user for the concerned session(s). With respect to FIG. 4, session 1 of User 1 generates a first object for experience feed 1, session 2 generates a second object for experience feed 2, and sessions 3 and 4 generate a third object for experience feeds 3 and 4.

Instantiated first, second, and third objects for User 1 can be combined in varied modes to generate experience metrics. For example, a first experience metric can be formed corresponding to first object, and a second experience metric can be formed corresponding to second and third objects. Experience metrics can be combined based on feed characteristics, rules set, and user in context (such as viewer or broadcaster), among other parameters. Generated experience metrics can then be used to evaluate experience feeds in terms of their viewership pattern, interest, ranking, broadcasting parameters, venue attributes, impact on relevant users or groups of users, among other factors.

Experience metrics can similarly be generated based on instantiated objects for subsequent users or groups/clusters thereof. For instance, a single cluster experience metric can be generated for Users 2 and 3, each viewing or interacting with three experience feeds and generating three objects for respective sessions. Such a cluster experience metric can help understand how a particular group, say a group of ardent fans of Backstreet Boys felt, interacted with, rated, and commented about its recently held concert in New York. Cluster of users can also be formed of a group of, say sponsors of an event, who can share their experiences, thoughts, and behavior about the event through instantiated objects and help generate metrics that can assist event managers or broadcasters to understand gaps in their relationships, expectations, and try to take actions to bridge such gaps.

User 4 of FIG. 4 demonstrates another exemplary implementation of object instantiation and metric generation process, wherein four experience feeds that the User 4 interacts with lead to creation of four respective sessions and four independent objects for each feed. Experience feed metric generation module (element 226 of FIG. 2) can then be used to generate four independent experience metrics for User 4, which can either be interpreted and evaluated independently or can be combined together to yield different outcomes, interpretations, suggestions, or recommendations.

FIG. 5 is a schematic 500 showing an exemplary representation of experience database 502. As discussed above, experience data, along with stored feed content, also stores feed attributes and parameters that define type and mode of configurational changes that can be done by a user before, during, or after an experience feed has been interacted with. Database 502 can further store user data and attributes thereof, which can indicate users that interacted or communicated with one or more experience feeds and their details including, say social interaction details, user type, demographic details, among other such details. Database 502 can further be configured to store experience feed metrics that indicate how a user configured feed attributes and/or parameters to view experience feeds, thereby indicating how concerned users viewed, interacted with, and felt about the event in context.

According to one embodiment, exemplary representation of experience database 502 shown in FIG. 5 illustrates five users "Pam Stewart", "ABC Broadcaster", "XYZ Events LLC", "DEF Shoes", and "Levi Scott". User details of each user can indicate type of user and the attributes that would be relevant for the user. For instance, "Pam Stewart" is a viewer and therefore may have attributes such as age, Twitter handle, number of feeds viewed, address, among other like details. Similarly, a broadcaster such as "ABC Broadcaster" may have attributes such as clients, number of events broadcasted, ranking, type of broadcaster, among others. Likewise, an advertiser such as "DEF Shoes" may have attributes such as annual turnover, types of events advertised, budget terms, number of events advertised, among other like attributes. User identifiers such as UserID_42356 can also be associated with each user irrespective of its type and/or category.

Experience database 502 can further include experience feed identifiers of feeds that a user viewed, managed, advertised, broadcasted, or interacted with in any manner. As each user can interact with multiple feeds and each feed can be processed by a plurality of users of same or different type, any schema can be used for representing database 502. Database 502 can further be of any type and can configure and store concerned experience data in any desired and customizable format. In addition, database 502 can further include multiple repositories that may be operatively coupled with each other to generate a single or multi-view representation. Experience feed identifier, in an example of FIG. 5, is Experience Feed_32 for User "Pam Stewart", and Experience Feed_24 for User "Levi Scott".

Experience database 502 can further include experience feed attributes that can indicate parameters based on which interaction with the feed or characteristics of the feed can be changed, amended, or modified. Such feed attributes and parameters too can change based on type of user, past history, feed in context, among many other parameters. As illustrated in representation 500, attributes for event user "XYZ Events LLC" include digital rights, celebrity details, event ratings, broadcaster details, among other like attributes that can help define type of interaction that an event manager would like to do with a given feed. Similarly, for a viewer "Levi Scott", attributes can include cost of event, event description and details, length of event, focal view options, location possibilities and possible changes therein, and broadcaster involved, among others. Each parameter and/or attribute can have a value associated therewith, which can help define actual settings or group of settings that the user used during its interaction.

Experience database 502 can further include experience feed metrics that help indicate actual interaction that the concerned user had with the experience feed. For instance, for "Pam Stewart", of the total feed length of 122 minutes, she watched only 22 minutes, and the actual portion she watched was from 10-32 minutes of the event feed. Other metrics can include any factor that a user experienced before the feed was initiated, during the feed, or after the feed was over. Number of comments on social media, number of times zoom settings or focal views or stadium locations were changed, number of likes/dislikes, are only some of the exemplary metrics. As experience feed attributes and parameters change based on user in context, metrics too can change based on the user involved. For instance, for a broadcaster, change in viewership over the duration of the event, comments on broadcasting quality, change in revenue patterns over the feed duration, duration of highest response are few of the exemplary metrics. Similarly, for an advertiser/sponsor, number of website hits during the event, portions having highest hits, comments on advertiser, expense pattern, among others are few of the exemplary metrics.

Figure 6:
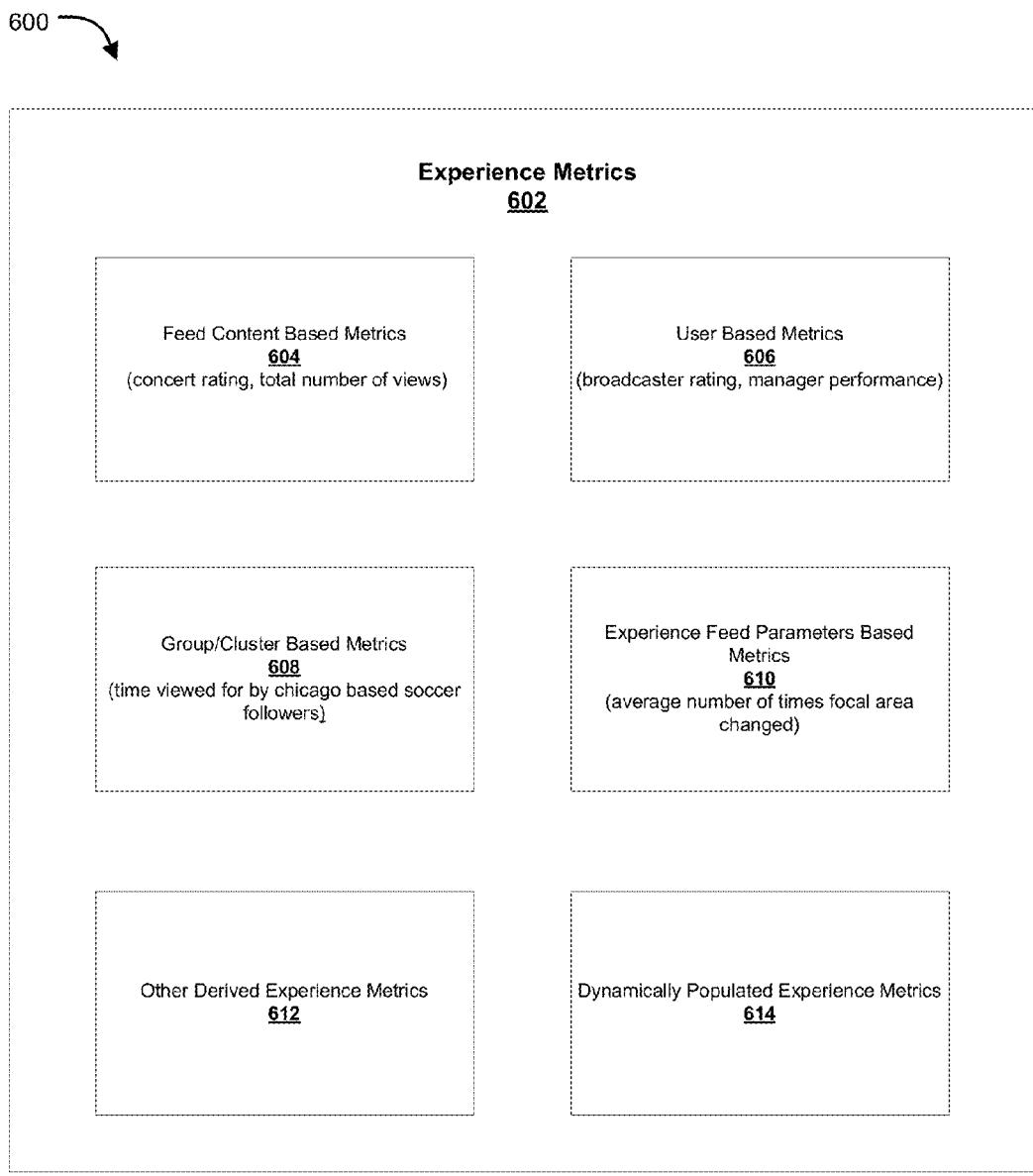
FIG. 6 is a schematic showing exemplary blocks and constituents of experience metrics.

FIG. 6 is a schematic 600 showing exemplary blocks and constituents of experience metrics 602. According to one embodiment, experience metrics can either be defined separately based on their based on type of metric, context of metric, type of user for which metric is defined, priority of metric, among other factors. Representation 600 is an exemplary illustration of different types of metrics including, but not limited to, feed content based metrics 604, user based metrics 606, group/cluster based metrics 608, experience feed parameters based metrics 610, other derived experience metrics 612, and dynamically populated experience metrics 614. One should appreciate that any other metric can be defined, either as a sub-category of above defined metrics, or as an independent metric. Metrics can either be independent of each other or can be operatively coupled to give an enhanced perspective of users/stakeholders. For instance, a metric configured to compute average number of users that watched a given experience feed for more than 12 minutes, may be dependent on individual metrics from user based metrics 606 and content based metrics 604.

Feed content based metrics can include varied analysis and evaluation outputs that are based on content of the feed such as total number of views, number of comments on each performer of the event, event rating based on performance, among other such metrics. One should appreciate that metrics need not necessarily have objective values and can include subjective evaluations as well. For instance, user based metrics, which can include evaluations on different users, can include metrics such as perception of viewers about venue of the event, which may not necessarily be objectively measured and therefore quantified. Qualitative evaluations can therefore be performed and analyzed to derive desired outcomes.

In accordance with above mentioned metrics, group based metrics can include evaluation on how a group of users felt about or interacted with experience feeds. For instance, one exemplary metric can depict average time for which a Chicago-based soccer fan group viewed a soccer event along with indicating portions of event that were viewed the most. Any other derived metric 612 can be inferred based other metrics or objects or a combination thereof. Dynamically populated experience metrics 614 can include metrics that can automatically be filled and then continuously updated in real-time based on changes taking place in the event or in user's interaction/behavior pattern. For instance, based on number of tweets being done by viewers registered for an event, run-time computation can be performed of metrics such as portions of event having highest average number of tweets, most popular tweet, total number of tweets, number of tweets from different geographies, among many other types of desired inferences.

Figure 7A:
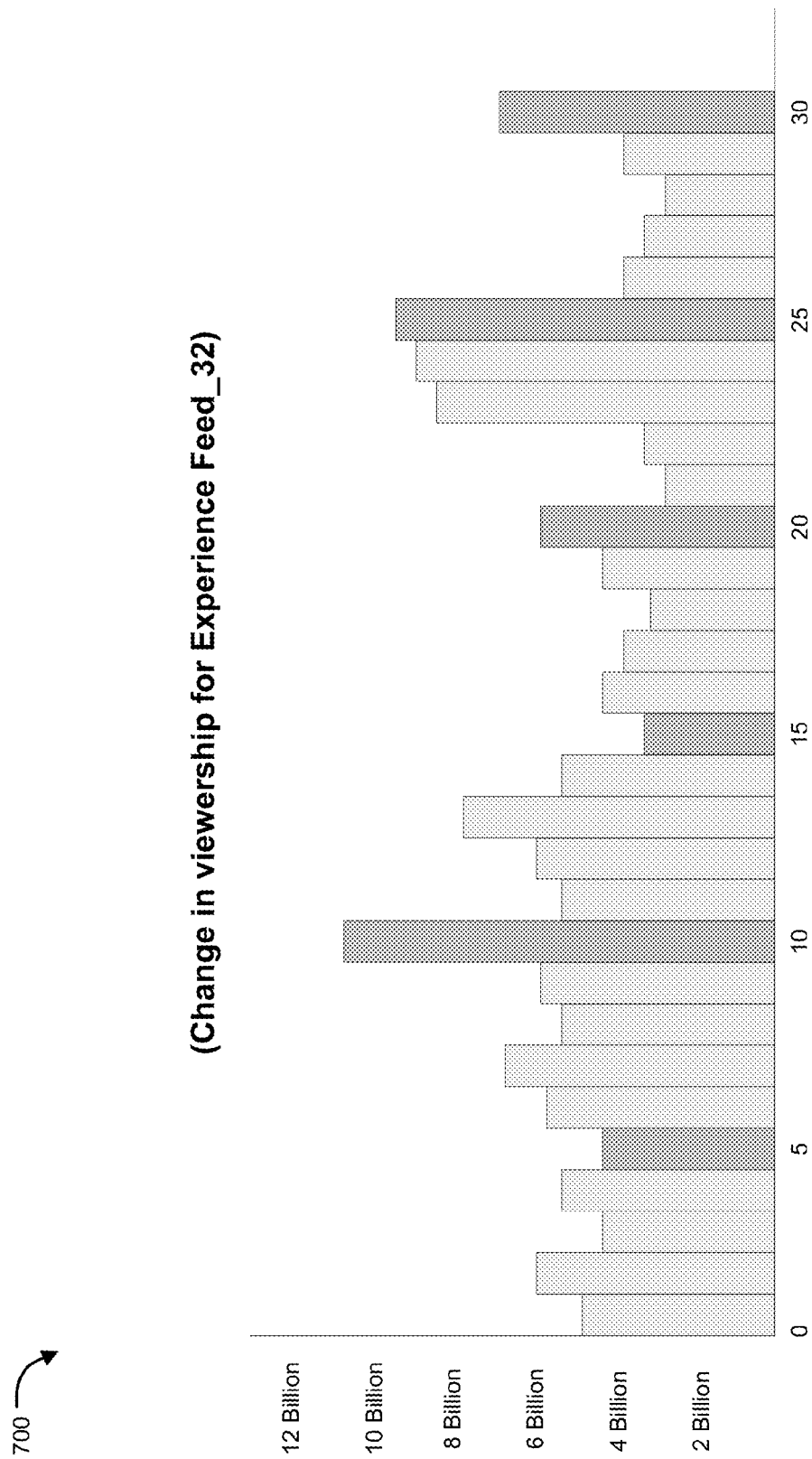
FIGS. 7(*a*) and 7(*b*) show exemplary representation of experience metrics.
Figure 7B:
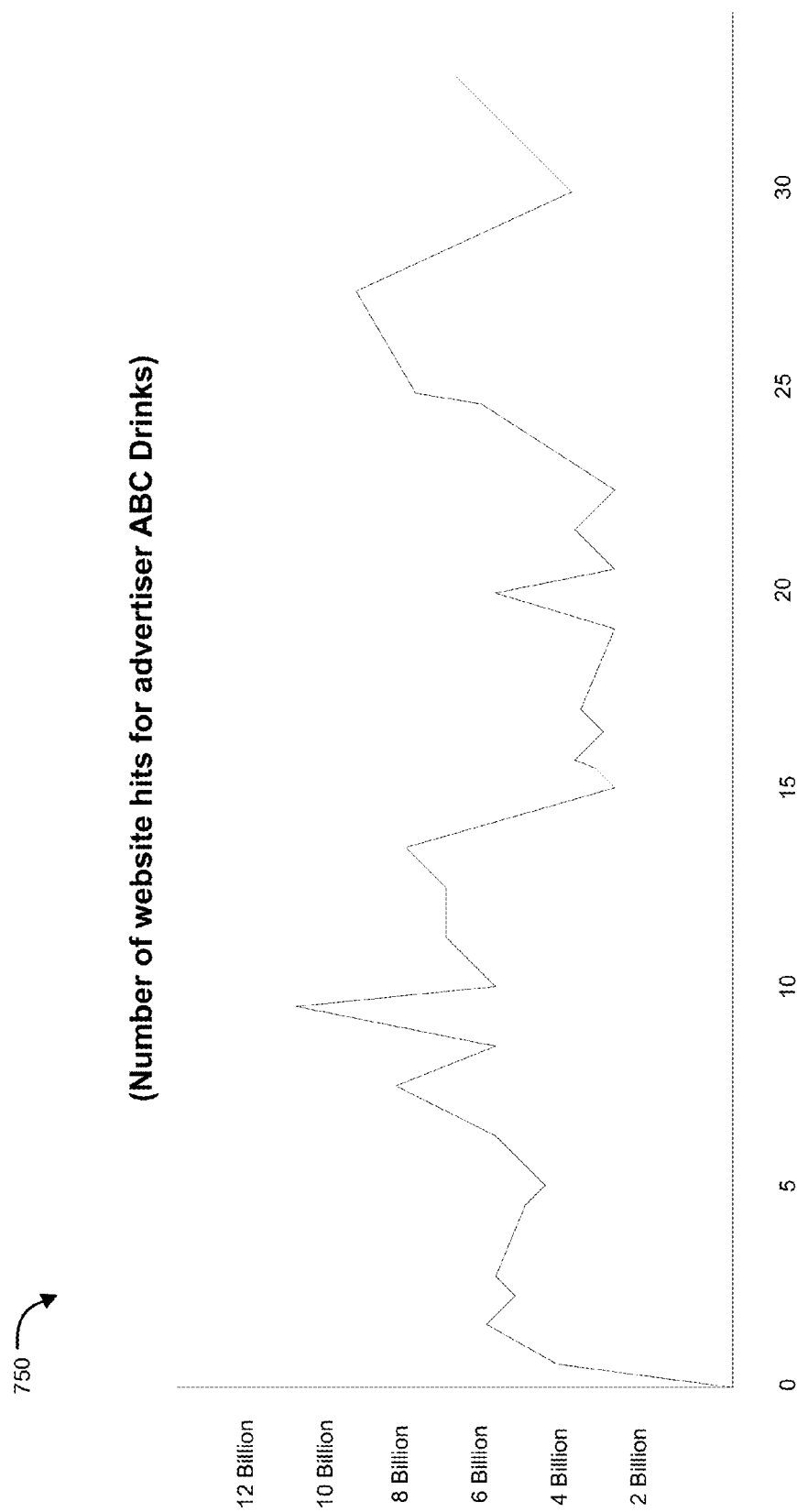

FIGS. 7(a) and 7(b) show exemplary representations of experience metrics. In an embodiment, FIG. 7(a) shows change in viewership for experience feed having feed identifier as feed 32 over a period of 30 minutes. The representation 700 has been shown on a minute-by-minute basis and can be configured and customized based on user needs and requirements. As can be seen, viewership increased significantly in the 10'th minute and then between 23'rd-25'th minute. Once such a representation has been analyzed, feed can be reviewed to understand portions of the feed that might have led to increased viewership or to, for example, decrease in viewership during the 21'st minute.

On similar lines, another representation 750 of a website hits metric for an advertiser ABC Drinks has been shown in FIG. 7(b), where, as can be seen, number of hits on the website increased drastically in the 10'th minute and then again after the 25'th minute. Events responsible for such increased number of hits can then be evaluated and processed for future use. In another embodiment, multiple representations can be corroborated to identify events that give a pattern of user behavior and interaction. For instance, as the number of views were highest in the 10'th minute and the number website hits were also highest during the same time, responsible activity in the respective feed can be closely monitored to evaluate reasons for the same.

It would be appreciated that illustrations such as presented in FIGS. 7(a) and 7(b) can be configured to represent a plurality of instantiated objects together and therefore the representations need not only represent one set of attributes of an object but collectively showcase a number objects together to help a stakeholder appreciate the experience or perspective of the concerned user(s) involved in generating the set of objects as to how they responded or evaluated or felt about the experience feeds to which the objects pertain. Thus, contemplated metrics can include statistical information across a broad spectrum of experience analytics objects. The metrics can include averages, means, distributions (e.g., Gaussians, Poisson, etc.), scatter plots, contour plots, clusters, or other types of analysis metrics.

Figure 8A:
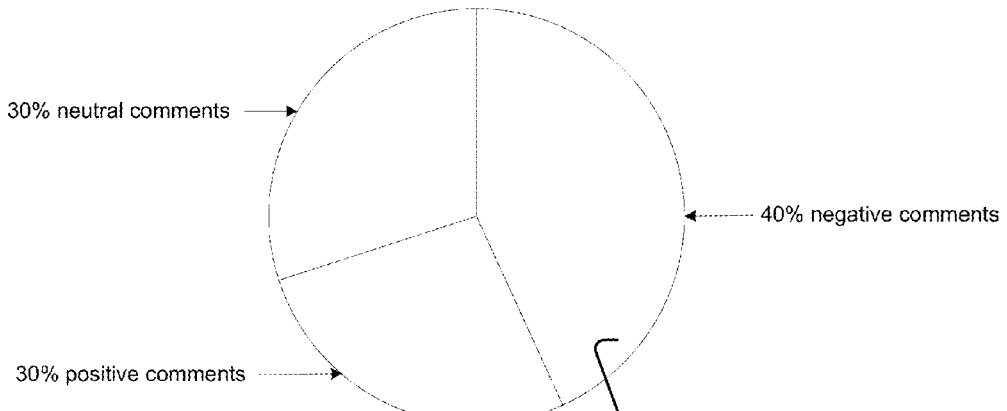
FIGS. 8(*a*) and 8(*b*) show exemplary representation of experience metrics.
Figure 8B:
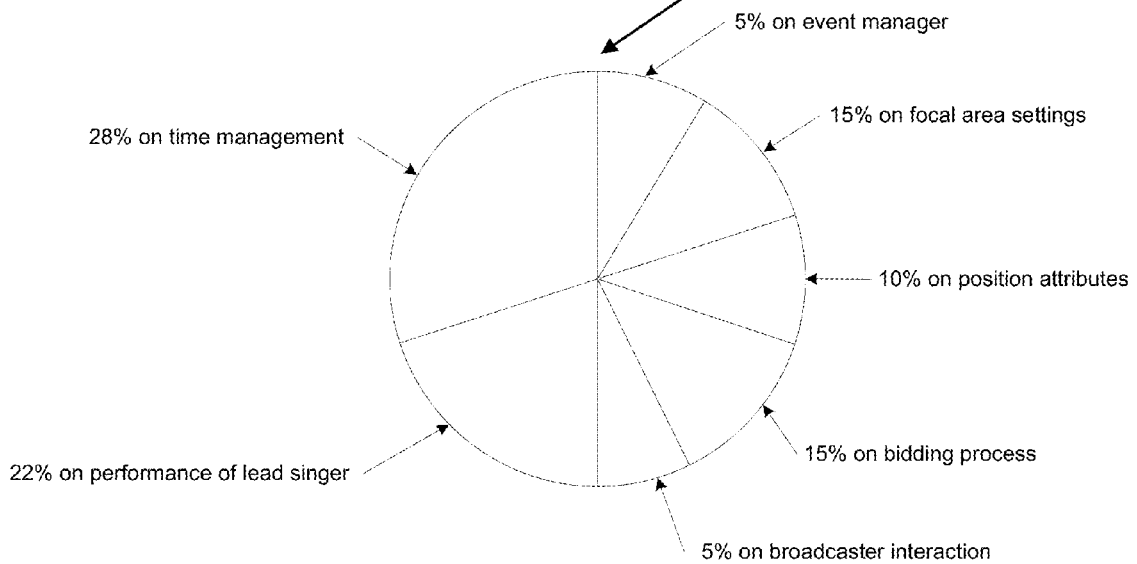
Figure 9:
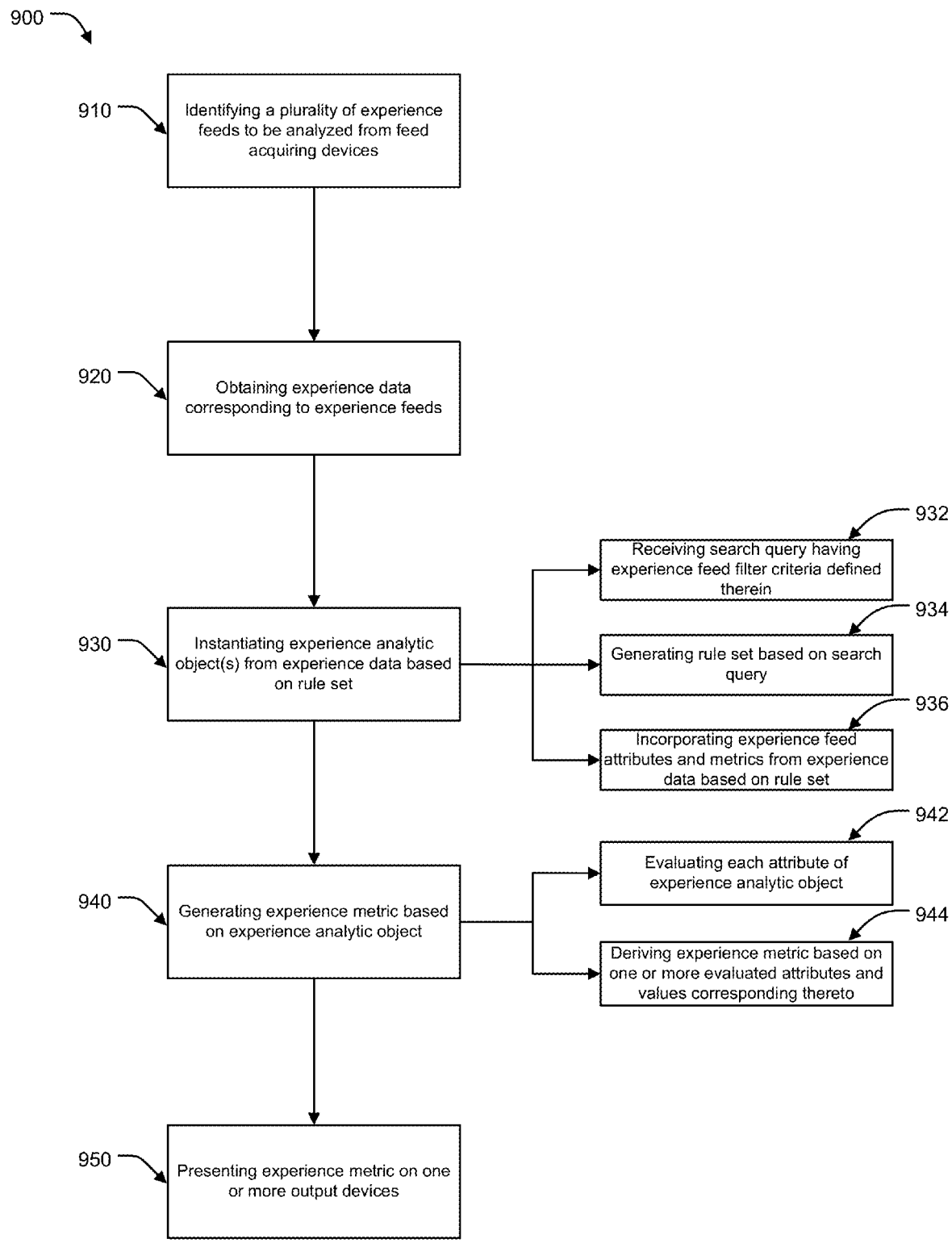
FIG. 9 presents a method executable by a experience feed analysis engine of the inventive subject matter.

FIGS. 8(a) and 8(b) show exemplary representations 800 and 850 of experience metrics. As can be seen, FIG. 8(a) illustrates a social networking behavior based metric by representing types of comments given by a viewer having user ID_340002 for an experience feed viewed through a session having session ID_23042. As can be seen from the representation 800, 30% of the comments for the respective feed made on a social networking platform such as Facebook were neutral, 40% of the comments were negative comments, and 30% of the comments were positive. As comments not only relate to event attributes per se, but also on the broadcaster, event manager, sponsor, among other stakeholders and parameters thereof, FIG. 8(b) gives a representation 850 of the type of negative comments being made. For instance, 5% of the comments were made on the event manager, 15% on the focal area settings, and the highest number (28%) of comments were made on time management of the event, such as because of the event starting late, inadequate performances, deviation from decided agenda, among other such reasons. Although FIGS. 8(a) and 8(b) reference a specific user and a session ID, one should appreciate that such metrics as comprises an aggregated metric FIG. 9 presents a method 900 executable by an experience feed analysis engine of the inventive subject matter. Method 900 includes a method of instantiating objects based on experience feeds and rules set, and using instantiated objects to generate experience metrics. Contemplated methods include providing access to an experience database configured to store experience data related to a user and associated with a plurality of experience feeds.

Step 910 can include identifying a collection of or a plurality of experience feeds to be analyzed, wherein the feeds can be retrieved from feed acquiring devices configured to receive and broadcast event feeds to one or more viewers. The collection of experience feeds represents an aggregated experience of a user as a whole. While some of the above examples are directed to a music events, one should appreciate that all suitable events are contemplated, including for example, a concert, a sporting event, a live action game (e.g., poker, chess, etc.), a vacation, a disaster, a news story, an expedition, a traffic event, a live event, a flash mob, a fashion show, a shopping event, a reality event, an accident, an emergency, a party, a premier, or other type of events.

Step 920 can include obtaining a set of experience data from the experience database and pertaining to identified experience feeds. The collection can be treated as a whole, or more preferably the experience data can be obtained for each member feed in the collection. Experience database can include data relating to feed content, experience parameters and attributes, experience metrics, and user data and attributes related thereto. Experience database can also be configured as a collection of multiple repositories that are operatively coupled with each other to represent the experience database. One should appreciate that the experience data can reflect usage by an experience user during their session. In such embodiments, the experience data might represent one or more of the following viewer information: demographic, length of time in session, number of feeds view, time viewing each feed, number of peripheral feeds, interactions with clusters of feeds, broadcasters viewed, or other viewer related information. In additional embodiments, the experience data can reflect usage by an experience broadcaster. Example experience broadcaster information could include number of viewer, broadcaster demographics, broadcaster revenue generated from feeds, broadcaster location or position, or other types of broadcaster data.

Step 930 can include instantiating an experience analytic object from the sets of experience data according to rules set where the experience analytic object has experience attributes and values generate as a function of the sets of experience data. Rules set can include one or more conditions based on relevant experience data can retrieved and then processed to generate analytic object(s). Example rules sets can include a business rule set, a recognition rule set, an advertisement rule set, a digital rights rules set, or other type of rules set. One should appreciate that the instantiate experience object could be one of many instantiated objects as the request of an analyst wishing to derive meaning from many users' experiences. Step 930 can include step 932 which includes receiving a search query defining conditions and/or search parameters that help filter experience data, possibly via an analyst interface (e.g., API, web browser, etc.). In such a scenario, the analysis engine can be configured to instantiate a results set comprising a plurality of experience analytics objects that satisfy the search query. Such an approach is advantageous when conducting a statistical analysis. At step 934 of step 930, includes generating a rules set based on received search query and further based on processing of search query with respect to a rules database. At step 936 of step 930, object is instantiated based on one or a combination of filtered attributes, metrics, parameters, and content of the experience data. Each instantiated object can be configured to have one or more attributes and values corresponding thereto. Example attributes and values could represent at least one or more of the following: a perception, a point of focus, a class of request, a class of response, a critical mass, a demographic, a psychographic, a mob property, or other type of attributes. Such attributes and values allow an analyst to identify experience analytic objects of interest. For example, in embodiments where an experience analytic object comprises an N-tuple of attribute-value pairs, an analyst could request all instantiated experience analytic objects having a common mob focal point in order to possibly determine an average age of such a cluster of viewers or broadcaster.

An especially interesting experience attribute includes a monetary value. In some embodiments, the experience analysis engine can be configured to map the monetary value as an attribute value to the experience analytic object. Contemplated monetary values could include a bid, a monetary value, a trade good, a barter good, a bounty, a coupon, an incentive, or other value. In such embodiments, an analyst might have to pay a fee or other charge to gain access to the object. Alternatively, the analyst might analyze how much a viewer was willing to spend as part of their experience, or how much revenue a broadcaster made during creation of their feeds. It should be appreciated that the engine can provide the analytic object exclusively to an analyst or other entity, possibly in exchange for an exclusivity fee determined as a function of a value of associated attributes and their values.

Another interesting aspect of an experience analytic object is that it can represent a leading indicator with respect to an event. The object can include attributes and values that indicate a possible trend with respect to the event. For example, the analytic object could include a rate at which broadcasters engage with an event. If the rate exceeds a threshold, then the rate might indicate the event is about to go viral. At which point, the fees associated with accessing the events experience feeds or analytic objects can be adjusted; perhaps advertising fees would increase.

Still another aspect of an experience analytic object is that it can represent a viewer's click-stream within the user's aggregated experience session as hinted to above. Thus, the analytic object can include attributes and values that indicate how the viewer "moves" through their aggregate experience or among the various feeds. In such as scenario, the experience analytic object could comprise session-specific experience attributes and values (e.g., number of session clicks, number of feeds access, view shifts from one feed to another, time-shifting, etc.).

Step 940 can include generating an experience metric from at least the attributes and values of one or more instantiated experience analytic object. The metrics can include simple metrics representative of a single experience or session. Additionally, the metrics can include measured values across many different experience analytic objects, possibly including a statistical aggregate. For example, a metric might include a histogram of broadcaster age across all sessions associated with a specific event (e.g., concert, movie, shopping, etc.). Metrics can help evaluate an interaction pattern and/or an overall impact that respective experience feed had on concerned set of users. Step 940 can include step 942 to evaluate each attribute of instantiated object and value thereof and use such evaluation of one or more objects, at step 944, to derive experience metric(s) based on one or more attributes and corresponding values. Experience metrics can take on many different forms as alluded to above. In some embodiments, the experience metric can reflect a cluster of participants; viewers, broadcaster, advertisers, or other entities. The clusters of participants can be identified through their location, position, field of view, demographic, branding message, or other factors determined from associated experience data. As discussed with respect to step 932, the analysis of experience analytic objects can be conducted on a results set. In such cases, the experience analysis engine can be configured to generate the experience metric from such a results set.

Step 950 can include presenting one or more experience metrics for one or more objects pertaining to at least one experience feed on an output device. Such presentation can help stakeholders and/or users to take appropriate and desired actions to help improve the quality of events, broadcast, management, along with understanding viewer's interests, viewing patterns, among other aspect that are within the scope of the present disclosure.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of automatically switching information feeds to a user to accommodate changing content provider tags, wherein a first content provider provides a first one of the information feeds (the first information feed) and a second content provider provides a second one of the information feeds (the second information feed), comprising using a computer system to execute the following steps:

receiving at least a first event tag from the first content provider for the first information feed;

receiving at least a second event tag from the second content provider for the second information feed;

receiving desired content characteristics and desired formatting characteristics from a user;

selecting a first feed from the first content provider based on comparison of the desired content characteristics with the first event tag;

optionally reformatting the first selected feed to produce a first personalized version of the first selected feed based on the desired formatting characteristics;

causing the user to receive the first selected feed or the personalized version of the first selected feed;

receiving an updated tag for the first selected feed from the first content provider, and determining that the first event tag no longer satisfies the desired content characteristics;

automatically selecting the second feed from the second content provider based on comparison of the desired content characteristics with the second event tag;

optionally reformatting the second selected feed to produce a second personalized version of the second selected feed based on the desired formatting characteristics;

causing the user to receive the second selected feed or the personalized version of the second selected feed;

determining whether a user engagement rate of the feed content exceeds an engagement threshold, and wherein exceeding the engagement threshold is indicative of the event having achieved a viral status; and in response to determining that the event has achieved the viral status, adjusting one or more fees associated with the feed content.

2. The method of claim 1, further comprising the computer system:

receiving an updated desired content characteristic, wherein both of the first and second event tags fail to the updated desired content characteristic; and receiving at least a third event tag from a third content provider for a third information feed;

selecting the third feed from the third content provider based on comparison of the updated desired content characteristics with the third event tag;

optionally reformatting the third selected feed to produce a third personalized version of the second selected feed based on the desired formatting characteristics; and causing the user to receive the third selected feed or the personalized version of the third selected feed.

3. The method of claim 1, wherein at least one of the desired content characteristics and the desired formatting parameters is determined using past viewing behaviors of the user.

* * * * *